United States Patent
Baroudi et al.

(10) Patent No.: US 10,492,064 B1
(45) Date of Patent: Nov. 26, 2019

(54) SYSTEM FOR PROTECTING PRIVACY OF A BASE STATION IN WIRELESS SENSOR NETWORKS

(71) Applicant: King Fahd University of Petroleum and Minerals, Dhahran (SA)

(72) Inventors: Uthman Baroudi, Dhahran (SA); Farouq Muhammad Aliyu, Dhahran (SA); Essa Qaem Naji Shahra, Dhahran (SA); Ahmed Salman Hassan Al Naser, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/239,598

(22) Filed: Jan. 4, 2019

(51) Int. Cl.
| | |
|---|---|
| *H04W 12/02* | (2009.01) |
| *H04W 28/02* | (2009.01) |
| *H04L 29/06* | (2006.01) |
| *H04W 12/12* | (2009.01) |
| *H04W 12/00* | (2009.01) |

(52) U.S. Cl.
CPC .......... *H04W 12/02* (2013.01); *H04L 63/04* (2013.01); *H04L 63/1491* (2013.01); *H04W 12/00516* (2019.01); *H04W 12/12* (2013.01); *H04W 28/0226* (2013.01)

(58) Field of Classification Search
CPC ... H04L 67/12; H04L 63/105; H04L 63/1408; H04W 84/18; H04W 40/02; H04W 4/38; H04W 12/08
See application file for complete search history.

(56) References Cited

U.S. PATENT DOCUMENTS

| | | | | |
|---|---|---|---|---|
| 10,034,185 | B2* | 7/2018 | Baroudi | H04W 4/70 |
| 2007/0171050 | A1* | 7/2007 | Westhoff | H04W 12/0013 |
| | | | | 340/539.22 |
| 2009/0059842 | A1* | 3/2009 | Maltseff | H04W 8/005 |
| | | | | 370/328 |
| 2015/0067841 | A1* | 3/2015 | Xu | H04L 63/0407 |
| | | | | 726/22 |

FOREIGN PATENT DOCUMENTS

| | | |
|---|---|---|
| CN | 103228008 A | 7/2013 |
| CN | 103200185 B | 12/2015 |
| CN | 105916120 A | 8/2016 |

OTHER PUBLICATIONS

Bangash et al., "MimiBS: Mimicking Base-Station to Provide Location Privacy Protection in Wireless Sensor Networks", Sep. 2017 (Year: 2017).*

(Continued)

*Primary Examiner* — Dung Hong
(74) *Attorney, Agent, or Firm* — Oblon, McClelland, Maier & Neustadt, L.L.P.

(57) ABSTRACT

A Wireless Sensor Network for providing Base Station anonymity is described. The network comprises sensor nodes, cluster heads, fake base stations and a base station arranged in a grid configuration. The location of the base station is obscured by managing the traffic in the network by a coverage-aware technique. The coverage aware technique achieves Base Station anonymity by using data aggregation and fake packet injection without affecting coverage of the sensor nodes.

20 Claims, 20 Drawing Sheets

(56) References Cited

OTHER PUBLICATIONS

Conner et al., "Using Data Aggregation to Prevent Traffic Analysis in Wireless Sensor Networks", 2006 (Year: 2006).*
Hafsa et al., "Camouflaging Base Station in Wireless Sensor Network Using Cluster Based MORF Approach", 2017 (Year: 2017).*
Deng et al., "Decorrelating Wireless Sensor Network Traffic to Inhibit Traffic Analysis Attacks", 2006 (Year: 2006).*
Lopez, "Location Privacy in Wireless Sensor Network", 2013 (Year: 2013).*
Shu, "Efficient Network Camouflaging in Wireless Network", Texas A&M University, 2005 (Year: 2005).*
Chow et al. "Privacy Enhancing Technologies for Wireless Sensor Networks", 2014 (Year: 2014).*
Prusty, "The Network and Security Analysis for Wireless Sensor Network: A Survey" (Year: 2012).*
Youssef et al., "On the Accuracy of Multi-hop Relative Location Estimation in Wireless Sensor Networks", 2011 (Year: 2011).*
Bushnag, et al.; Source Anonymity against Global Adversary in WSNs Using Dummy Packet Injections: A Survey; MDPI; Electronics 2018, 7, 250; www.mdpi.com/journal/electronics; 26 Pages.
Gaikwad, et al.; A Review of Privacy Preserving Techniques in Wireless Sensor Network ; Network and Complex Systems. vol. 4, No. 3; 2014; 6 Pages.
Elsherif, et al.; An Efficient Secure Scheme for Data Aggregation in Wireless Sensor Networks Using the Additive Property of Complex Numbers; Journal of Theoretical and Applied Information Technolofy, vol. 96, No. 09; May 15, 2018; 16 Pages.

* cited by examiner (a)

(b)

SYSTEM FOR PROTECTING PRIVACY OF A BASE STATION IN WIRELESS SENSOR NETWORKS

BACKGROUND OF THE INVENTION

Field of the Invention

The present disclosure is directed to a method, system and apparatus for obscuring the location of a base station in a wireless sensor network by data aggregation and fake packet injection.

Description of Related Art

Wireless sensor networks (WSN) are networks of wireless devices with limited resources such as computation power, memory and energy. These devices are known as sensor nodes. Sensor nodes may be densely deployed within a given area. The position of sensor nodes does not need to be engineered or predetermined. This allows their random deployment in inaccessible terrains or in disaster relief operations. Furthermore, sensor nodes communicate with other systems/networks through a central node known as the Base Station (Base Station), thereby making the Base Station a single point of failure. Adversaries may attack the Base Station because of this exceptional role, therefore, hiding the base station is necessary. (See N. Baroutis and M. Younis, "Using fake sinks and deceptive relays to boost base-station anonymity in wireless sensor network," in 2015 IEEE 40th Conference on Local Computer Networks (LCN), October 2015, pp. 109-116, incorporated herein by reference in its entirety).

In general, anonymity of the Base Station denotes hiding its location, role and/or identity from adversaries. Location may be defined as either the physical position of the Base Station, or its identity. (See V. Kumar and A. Kumar, "A novel approach for boosting base station anonymity in a wsn," International Journal Of Advanced Computer Science And Applications, Vol. 8, No. 9, pp. 114-120, 2017; S. Kesharwani and M. R. Dhage, "Location Privacy in Wireless Sensor Networks Using Anonymity", Singapore: Springer Singapore, 2018, pp. 221-230. [Online]. Available: https://doi.org/10.1007/978-981-10-4765-7 23; and C. Ozturk, Y. Zhang, and W. Trappe, "Source-location privacy in energy-constrained sensor network routing," in Proceedings of the 2Nd ACM Workshop on Security of Ad Hoc and Sensor Networks, ser. SASN '04. New York, N.Y., USA: ACM, 2004, pp. 88-93. [Online]. Available: http://doi.acm.org/10.1145/1029102.1029117, each incorporated herein by reference in their entirety). In the present disclosure, the definition of anonymity refers to location anonymity, as role/identity can be protected by encrypting the transmitted packets.

Three basic techniques are used by attackers to incapacitate the Base Station, these are;

1) Traffic volume and entropy: In this attack the adversary uses the quantity of traffic to locate the Base Station or uses the entropy of the system. (See N. Baroutis and M. Younis, "A novel traffic analysis attack model and base-station anonymity metrics for wireless sensor networks," Security and Communication Networks, vol. 9, no. 18, pp. 5892-5907, 2016, incorporated herein by reference in its entirety). The adversary assigns to each cell a probability that the Base Station is located within that cell. Let $p_i$ be the probability at time t that a cell i contains the Base Station. Then, the entropy of the system at time t is defined as:

$$\text{entropy}_t = -\sum_{i=0}^{N-1} p_i \times \log_2^{p_i} \quad (1)$$

This means that the smaller the size of the traffic, the less likely the adversary could identify the Base Station.

2) GSAT test: The GSAT test is a greedy local search algorithm that could be used totest the anonymity of Base Station. (See J. Deng, R. Han, and S. Mishra, "Countermeasures against traffic analysis attacks in wireless sensor networks," in Security and Privacy for Emerging Areas in Communications Networks, 2005. SecureComm 2005. First International Conference on, IEEE, 2005, pp. 113-126; and U. Acharya and M. Younis, "Increasing base station anonymity in wireless sensor networks," Ad Hoc Networks, vol. 8, no. 8, pp. 791-809, 2010. [Online], http://www.sciencedirect.com/science/article/pii/S1570870510000338, each incorporated herein by reference in their entirety). The GSAT test assumes a local eavesdropper rather than a more sophisticated global eavesdropper. An adversary that uses the GSAT algorithm performs a greedy local search by identifying radio transmission hot spots and gradually moves to the area where the Base Station is located. The adversary may be trapped in a location with high radio transmission that may not be the location of the Base Station. In such cases, the adversary randomly chooses a neighboring cell. This system depends on clustered networks as well as the volume of traffic in those cells, therefore the smaller the traffic in the cells, the more difficult it is to locate the Base Station.

3) Evidence theory: In evidence theory, a global adversary having a passive presence which silently eavesdrops on the radio communications in the observed area is considered. (See S. Alsemairi and M. Younis, "Cross-layer technique for boosting base-station anonymity in wireless sensor networks," International Journal of Communication Systems, 2017, incorporated herein by reference in its entirety). In this technique, each time a packet is intercepted during transmission from a source to a destination, it is considered as evidence of a communication link between source and destination pair. The probability of the possible receivers is determined. The sum of these probabilities for an intercepted packet is known as belief bel(p). The evidence theory technique can be deceived by fake packets as long as they never reach the Base Station.

Even though solutions are known, these solutions incur overhead in the form of energy loss due to excessive packets transmitted. (See L. Lightfoot and J. Ren, "R-star destination-location privacy schemes in wireless sensor networks," in 2015 IEEE International Conference on Communications (ICC), June 2015, pp. 7335-7340, incorporated herein by reference in its entirety).

A global eavesdropper is an adversary capable of gathering information about the whole network. (See K. Mehta, D. Liu, and M. Wright, "Location privacy in sensor networks against a global eavesdropper," in 2007 IEEE International Conference on Network Protocols, October 2007, pp. 314-323, incorporated herein by reference in its entirety).

Energy may be conserved by putting some sensors to sleep. However, it is important that the nodes put to sleep do not exceed the coverage threshold beyond which the accuracy of the sensed data is affected.

Privacy in WSN can be classified into two broad categories: Content privacy and contextual privacy. (See N. Li, N. Zhang, S. K. Das, and B. Thuraisingham, "Privacy preservation in wireless sensor networks: A state-of-the-art survey," *Ad Hoc Networks*, vol. 7, no. 8, pp. 1501-1514, 2009, privacy and Security in Wireless Sensor and Ad Hoc Networks. [Online]. Available: http://www.sciencedirect.com/science/article/pii/S1570870509000407, incorporated herein by reference in its entirety). Content privacy is concerned with protecting the message that is transmitted over the network, while contextual privacy is concerned with protecting information regarding the network itself (e.g. location of source nodes, location of sinks, etc.). FIG. 1 illustrates the categories of WSN privacy.

Several techniques have been proposed to ensure the privacy of Base Stations in WSNs: Li et al. proposed an anonymity algorithm that aims at hiding the Base Station during both topology discovery phase and data transmission phase. (See X. Li, X. Wang, N. Zheng, Z. Wan, and M. Gu, "Enhanced location privacy protection of base station in wireless sensor networks," in 2009 *Fifth International Conference on Mobile Ad-hoc and Sensor Networks*, December 2009, pp. 457-464, incorporated herein by reference in its entirety). The Base Station starts the topology discovery phase by choosing a sensor node at random. The chosen node becomes the Pseudo Base Station. The Base Station simultaneously builds a tunnel between it and the Base Station by declaring the nodes along the tunnel "special nodes". The pseudo Base Station announces to the network that it is the base station and network topology is built around it. In order to confuse the adversary, the pseudo Base Station is changed from cycle to cycle and fake packets are injected into the network whenever real packets are transmitted. Nonetheless, the Base Station can be traced during the pseudo Base Station selection. Furthermore, packet tracing analysis can trace the Base Station since the tunnel uses the same bandwidth as the remaining part of the network.

Rather than creating a tunnel, some techniques create k pseudo nodes whose traffic volumes are equally high. (See G. Chai, M. Xu, W. Xu, and Z. Lin, "Enhancing sink-location privacy in wireless sensor networks through k-anonymity," *International Journal of Distributed Sensor Networks*, vol. 8, no. 4, p. 648058, 2012. [Online]. Available: https://doi.org/10.1155/2012/648058, incorporated herein by reference in its entirety). This is made possible by partitioning the network and in each partition a pseudo Base Station known as the designated node is selected. The designated node collects all messages originating from its partition. The designated nodes form Euclidean Minimum-Spanning Tree (EMST) which connects them to the Base Station—it is through this tree that designated nodes transmit their gathered information to the Base Station. However, k-anonymity algorithm ensures that the sink is not the last-hop for a transmitted packet. Jun et al. argued that the k-anonymity algorithm has two important weaknesses: (1) k-anonymity generally uses few nodes, therefore a high motivated adversary can attack all nodes with brute force. (2) It also consumes energy in the sense that the designated node is overwhelmed by the deluge of data sent by the nodes in its partition. (See J. Long, A. Liu, M. Dong, and Z. Li, "An energy-efficient and sink-location privacy enhanced scheme for wsns through ring based routing," *Journal of Parallel and Distributed Computing*, vol. 81-82, no. Supplement C, pp. 47-65, 2015. [Online]. Available: http://www-.sciencedirect.com/science/article/pii/S0743731515000660, incorporated herein by reference in its entirety). In general, regions near the sink consume more energy, thus making the network energy inefficient.

In order to improve anonymity and energy efficiency, a mobile Base Station is proposed by Kumar and Kumar (2017), Chen and Lin, and Yang et al. (See J. I.-Z. Chen and C.-H. Lin, "Algorithms for promoting anonymity of bs and for prolonging network lifetime of wsn," *Peer-to-Peer Networking and Applications*, vol. 7, no. 4, pp. 710-722, December 2014. [Online]. Available: https://doi.org/10.1007/s12083-012-0194-y; and Y. Yang, M. I. Fonoage, and M. Cardei, "Improving network lifetime with mobile wireless sensor networks," *Computer Communications*, vol. 33, no. 4, pp. 409-419, 2010. [Online]. Available: http://www.sciencedirect.com/science/article/pii/S0140366409002990, each incorporated herein by reference in their entirety). Yang et al. propose that, after a certain period, a sensor node should seize all communications and the Base Station is moved to a new location. The system hides the Base Station well, but forces the network to initiate a topology discovery phase each time the Base Station moves. Since topology discovery incurs a lot of traffic on the Base Station, the adversary may be able to track the Base Station as soon as it arrives in its destination. A solution to disconnecting the network while the Base Station is on the move is proposed by Kumar and Kumar, who suggest special nodes (SP) be introduced into the network to keep track of the Base Station during relocation. All other nodes get the location of the Base Station from these SPs. However, the constant communication between the SPs and the moving Base Station may reveal the location of the Base Station.

Alternatively, authors in Jian et al. and Bangash et al. avoid Base Station mobility issues by introducing fake packet generation. (See Y. Jian, S. Chen, Z. Zhang, and L. Zhang, "Protecting receiver-location privacy in wireless sensor networks," in *IEEE INFOCOM 2007—26th IEEE International Conference on Computer Communications*, May 2007, pp. 1955-1963; and Y. A. Bangash, L.-F. Zeng, and D. Feng, "Mimibs: Mimicking base-station to provide location privacy protection in wireless sensor networks," *Journal of Computer Science and Technology*, vol. 32, no. 5, pp. 991-1007, September 2017. [Online]. Available: https://doi.org/10.1007/s11390-017-1777-0, each incorporated herein by reference in their entirety). Jian et al. describe a Location Privacy Routing (LPR) protocol, where the routing path is always randomized so that the forwarding direction of the packet is not towards the receiver. In addition, fake packets are generated in order to equalize the probability of forwarding the packet to a neighbor. Although the probability of generating fake packets can be fine-tuned by the network, the large number of randomly moving fake packets may interfere with the transmission of real packets and ultimately lead to more energy consumption.

As a solution to the aforementioned problem, Bangash et al. propose an anonymity technique known as MimiBase Station. The technique works on top of a three tier network containing Base Station (Base Station), Aggregator Nodes (ANs) and Sensor Nodes (SNs). The ANs have greater but limited power and three times the transmission range of the SNs. The Base Station has more power than both ANs and SNs. MimiBase Station ensures energy efficiency by controlling the route and number of fake packets generated in the network. When the number of real packets sent by an SN to its neighboring AN reaches a certain threshold, the SN generates and transmits a fake packet with a time-to-live (TTL) value to be decremented at the next hop. An AN also generates fake packets. However, an AN can only generate a single fake packet after it has received real packets beyond a certain threshold value. The generated packet is sent to a randomly selected AN neighbor. Due to controlled fake packet injection MimiBase Station was shown to be capable of reducing energy consumption, but the Base Station could be traced by a packet tracking attack.

Jun et al. solves this problem through a technique known as the Ring Based Routing (RBR) scheme. In RBR, the network is partitioned into concentric circles with the Base Station hidden in the innermost circle. Therefore, nodes in the same circle have the same hop counts to the network center. Whenever a node senses an event, it transmits the generated packet (a) along the routing ring and (b) sends the data to the neighboring routing ring along the perpendicular direction towards the sink. The steps (a) and (b) are repeated in each routing ring. While moving packets in the circle efficiently hide the location of the Base Station, the need for packets to go round every ring will lead to early failure of the network due to rapid energy depletion.

The present disclosure provides a technique for boosting anonymity of the Base Station, in which the Base Station controls the amount of traffic coming from the network by managing both real and fake packets produced by the network without lessening the coverage of network. The technique is energy efficient and enables the network to elude an adversaries and global eavesdroppers.

The technique of the present disclosure further ensures anonymity by directing nodes in high traffic clusters to sleep wherein the quantity of sleeping nodes do not exceed a coverage threshold beyond which the accuracy of the sensed data is affected.

SUMMARY

In an exemplary embodiment, a wireless sensor network for providing base station anonymity is described. A plurality of wireless sensor nodes transmits nodal data to cluster heads. Cluster heads are arranged in a grid configuration, the grid having a center point, a first axis, a second axis and a boundary, wherein the first axis and the second intersect at the center point of the grid and extend to the boundary, and wherein the first axis and the second axis are perpendicular to one another. A plurality of fake base stations are arranged along the first and second axes of the grid configuration; and a base station is located at the center point of the grid configuration. Each cluster head has circuitry configured to receive nodal data packets from a unique set of sensor nodes chosen from the plurality of sensor nodes, aggregate the nodal data packets to originate an aggregated data packet, and transmit the aggregated data packet in a first direction toward a fake base station. Each fake base station has circuitry configured to receive an aggregated data packet from a cluster head and transmit the aggregated data packet in a second direction to the base station.

Upon receiving the aggregated data packet, the base station generates a fake data packet, which is transmitted in a third direction toward a fake base station on the first axis. The third direction is antiparallel to the first direction and is towards the location in the grid of the cluster head which originated the aggregated data packet.

Each fake base station has circuitry configured to receive at least one of an aggregated data packet and a fake data packet; and further has circuitry configured to transmit the at least one of an aggregated data packet and a fake data packet to at least one of a fake base station, a cluster head or the base station. When a fake base station receives a fake data packet, it determines the destination of the fake data packet, and either forwards it in the third to the next fake base station or transmits it in a fourth direction antiparallel to the second direction.

The originating cluster head receives the fake data packet, at which point transmission of the fake data packet ceases.

In the first embodiment, traffic control is further realized by the base station monitoring traffic from each cluster head and instructing the cluster head to either lower traffic or increase traffic based on comparison of the traffic level to a threshold.

In a second embodiment, a method for providing base station anonymity in a wireless sensor network includes a grid configuration of cluster heads, sensor nodes, fake base stations and a base station arranged in a grid configuration, as shown in the first embodiment. The cluster heads each aggregate nodal data during a time i from wireless sensors in its grid position, generate an aggregated data packet, transmit the aggregated data packet in a first direction toward the closest fake base station on the y axis. The fake base station receives and transmits the aggregated data packet in a second location toward the base station. Upon receiving the aggregated data packet, the base station generates a fake data packet, which it transmits in a third direction antiparallel to the first direction towards a fake base station. The method includes the fake base station forwarding the fake data packet in a direction antiparallel to the second direction, until the fake data packet is received by the originating cluster head, then ceasing the forwarding of the fake data packet.

The method of the second embodiment also includes a coverage aware technique which manages the level of traffic at the cluster heads to obscure the base station.

In a third embodiment, a non-transitory computer readable medium having instructions stored therein that, when executed by one or more processor, cause the one or more processors to perform a method for providing base station anonymity in a wireless sensor network is envisioned. The non-transitory computer readable medium method includes a grid configuration of cluster heads, sensor nodes, fake base stations and a base station arranged in a grid configuration, as shown in the first embodiment. The cluster heads each aggregate nodal data during a time i from wireless sensors in its grid position, generate an aggregated data packet, transmit the aggregated data packet in a first direction toward the closest fake base station on the y axis. The fake base station receives and transmits the aggregated data packet in a second location toward the base station. Upon receiving the aggregated data packet, the base station generates a fake data packet, which it transmits in a third direction antiparallel to the first direction towards a fake base station. The method includes the fake base station forwarding the fake data packet in a direction antiparallel to the second direction, until the fake data packet is received by the originating cluster head, then ceasing the forwarding of the fake data packet.

The non-transitory computer readable medium method of the third embodiment further includes a coverage aware technique which manages the level of traffic at the cluster heads in order to obscure the base station position and traffic level.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
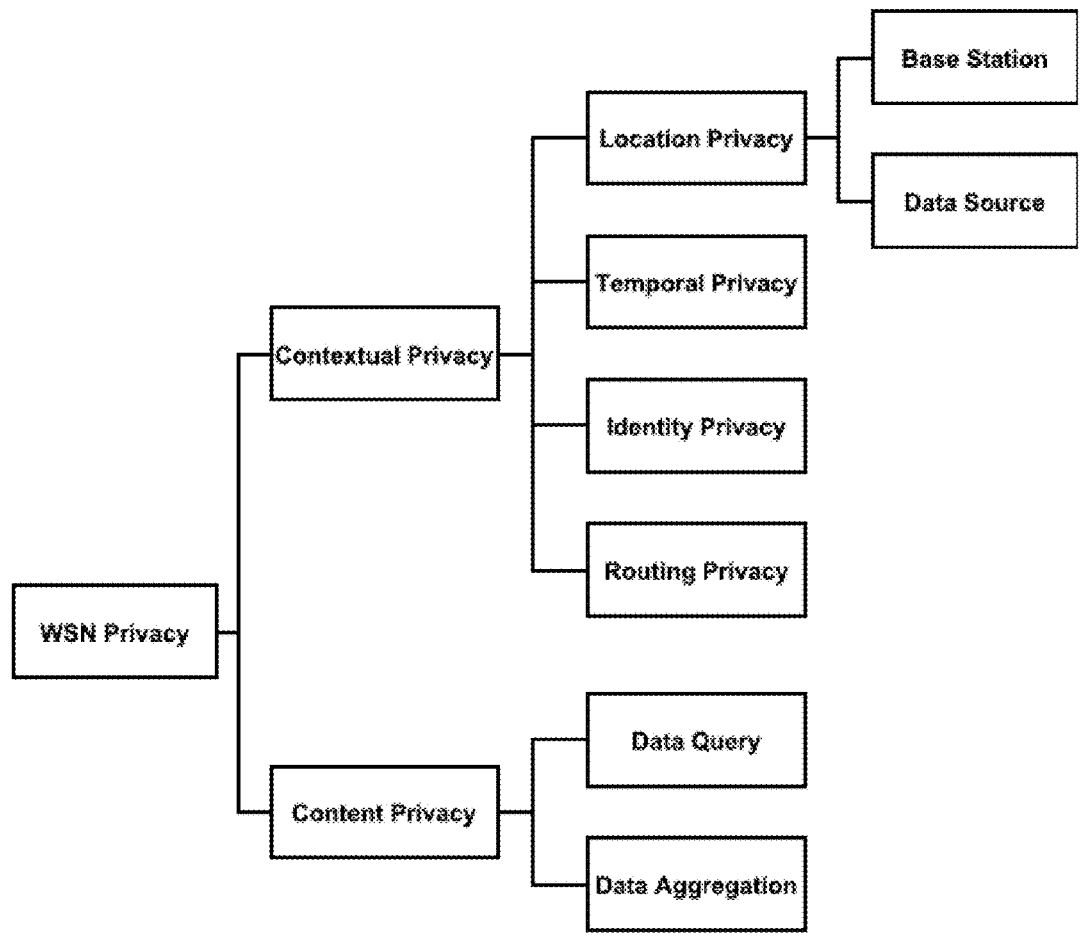
FIG. 1 illustrates the categories of WSN privacy.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

In the following embodiments, a wireless sensor network for providing base station anonymity, a method for providing base station anonymity in a wireless sensor network and a non-transitory computer readable medium having instructions stored therein that, when executed by one or more processors, causes the one or more processors to perform a method for providing base station anonymity in a wireless sensor network are described. A definition of anonymity of the Base Station denotes hiding its location, role and/or identity from adversaries.

The adversary in the context of the present disclosure is a variant of the model proposed by Mehta et al. and is characterized as follows:

1) The adversary is a global passive eavesdropper with the sole intention of finding the location of the Base Station. (See K. Mehta, D. Liu, and M. Wright, "Protecting location privacy in sensor networks against a global eavesdropper," *IEEE Transactions on Mobile Computing*, vol. 11, no. 2, pp. 320-336, February 2012, incorporated herein by reference in its entirety). The global adversary (GA) of the present disclosure is an adversary that has a general snapshot of the activities of the network under surveillance, which is updated periodically after $T_{snapshot}$ by its army of local eavesdropping sensor nodes (ASN). Thus the adversary's sensor network (AWSN) uses localization to pinpoint the location of the Base Station.

2) The Global Adversary uses Belief Theory on received traffic volume information of the network to find the location of the Base Station.

3) The Global Adversary has limitless resources such as energy, computation power and memory. But the ASNs have limited resources as do the sensor nodes in the deployed area. Therefore, all nodes in the two networks are preferably homogeneous, with the exception of the Base Station and the Global Adversary.

4) ASNs are equipped with either GPS or some sort of localization algorithm that allows them to know their location. Therefore, ASNs send both their data and their location to the Global Adversary for a proper snapshot of the deployed area.

5) All nodes in the network (i.e. WSN and AWSN) preferably have the same transmission range r and frequency band. The AWSN uses a Spanning Tree Network to deliver the information from around the network to the Global Adversary.

Figure 2:
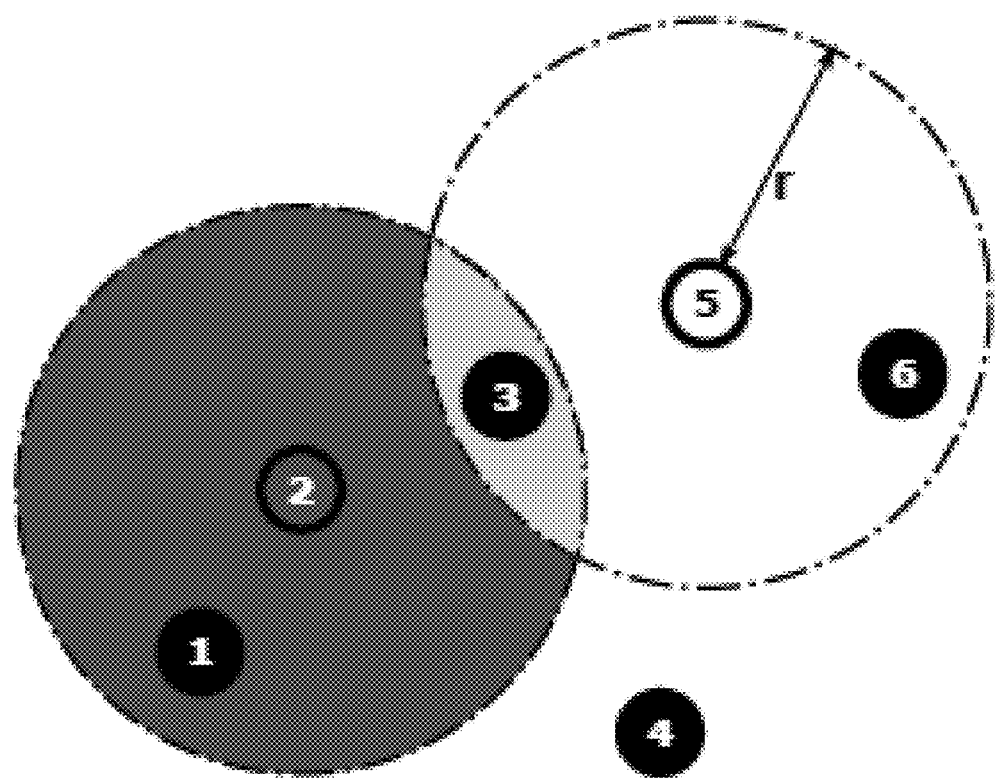
FIG. 2 is an exemplary diagram of crucial locations of adversary nodes in a WSN, according to certain embodiments.

6) As depicted in FIG. 2, the ASNs have no certainty that a node is a transmitter or a receiver, as it can only gather information about the quantity of traffic in the vicinity. An ASN trapped in the interference region of two nodes (for example, ASN 3) cannot record any data, because there is a different frequency or no frequency in the region due to destructive or constructive interference respectively.

7) Packets within the network (header inclusive) are encrypted and the AWSN has no knowledge of their content.

8) The Global Adversary has no awareness of the anonymity technique used in the network. Therefore, it greedily assumes that the area with the highest network traffic is the probable area in which the sensor node is located and that the sensor node with the highest network traffic is the Base Station.

9) The Global Adversary succeeds in locating the Base Station if it can provide a general location of where the Base Station resides.

Figure 3A:
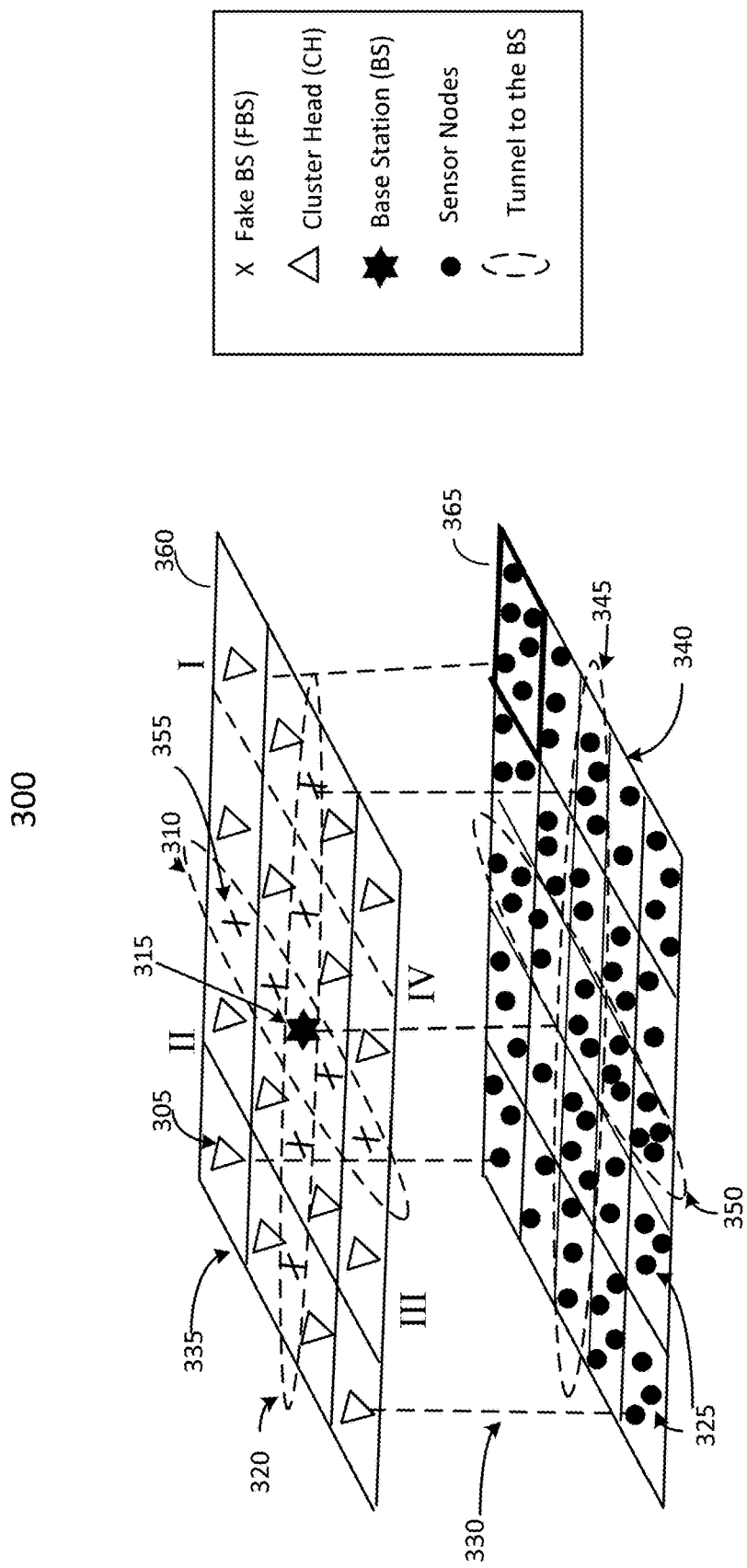
FIG. 3A illustrates the network structure, according to certain embodiments.

In an aspect of the present disclosure, a Wireless Sensor Network 300 for providing anonymity of a Base Station is shown in FIG. 3A. The network is constructed from uniformly deployed nodes. At steady state, the network comprises Sensor nodes 325, Cluster Heads 305 (CHs), Fake Base Stations 355 (FBS) and a Base Station 315 (BS).

The network is made up of a grid 335 of Cluster Heads with the Base Station at the center of the network. The network has two sets of Fake Base Stations 355; one horizontal 320 and the other vertical 310, spanning to the end of the network and intersecting at the Base Station. The grid is partitioned into four quadrants by Fake Base Stations as shown in FIG. 3A. The wireless sensor grid is configured by uniform randomly deployed nodes in grid-like clusters, where the each cluster communicates with an associated cluster head over a communication channel 330.

The term "grid" does not imply any distribution of sensor nodes or number of cluster heads, nor do the sections of the grid have to be the same size. Further, a quadrant may be larger or smaller depending on the location of the sensor nodes with respect to the Base Station. In a non-limiting example, a Wireless Sensor Network 300 may include 400 sensor nodes 325, which are non-evenly distributed with respect to the Base Station. Two hundred may be distributed to the right of the BS and one hundred to the left of the BS, with one hundred aligned along the axes. Quadrant I may include 150 sensor nodes where Quadrant IV may include 50 sensor nodes. If a cluster head is capable of handling the traffic of up to 25 sensor nodes, there may be a greater number of grid divisions or a greater number of cluster heads in Quadrant I than there are in Quadrants II, III and IV (see FIG. 3A).

Sensor nodes read data from their environment and transmit it to their respective Cluster Head as shown by communication channel 330. In essence, the Cluster Head serves as a Base Station to its cluster. The Cluster Head then aggregates the received data and transmits it horizontally (in a first direction parallel to the x axis) to the Fake Base Station to its left (for nodes in the first (I) and fourth (IV) quadrant) or the right (for nodes in the second (II) and third quadrant (III)). Quadrant II of FIG. 3B(a) depicts a cluster head $305_{22}$ in the second quadrant transmitting horizontally and to the right toward Fake Base Station $355_{02}$. The aggregated data packet must be forwarded by intermediate cluster head $305_{12}$ to reach Fake Base Station $355_{02}$. The Fake Base Station $355_{02}$ transmits the aggregated data in a second direction towards the Base Station 315 along axis y. The aggregated data packet is forwarded by intermediate Fake Base Stations between the Fake Base Station $355_{02}$ and Base Station 315 until it reaches Base Station 315.

All nodes are equipped with localization capability, which enables accurate routing.

Figure 3B:
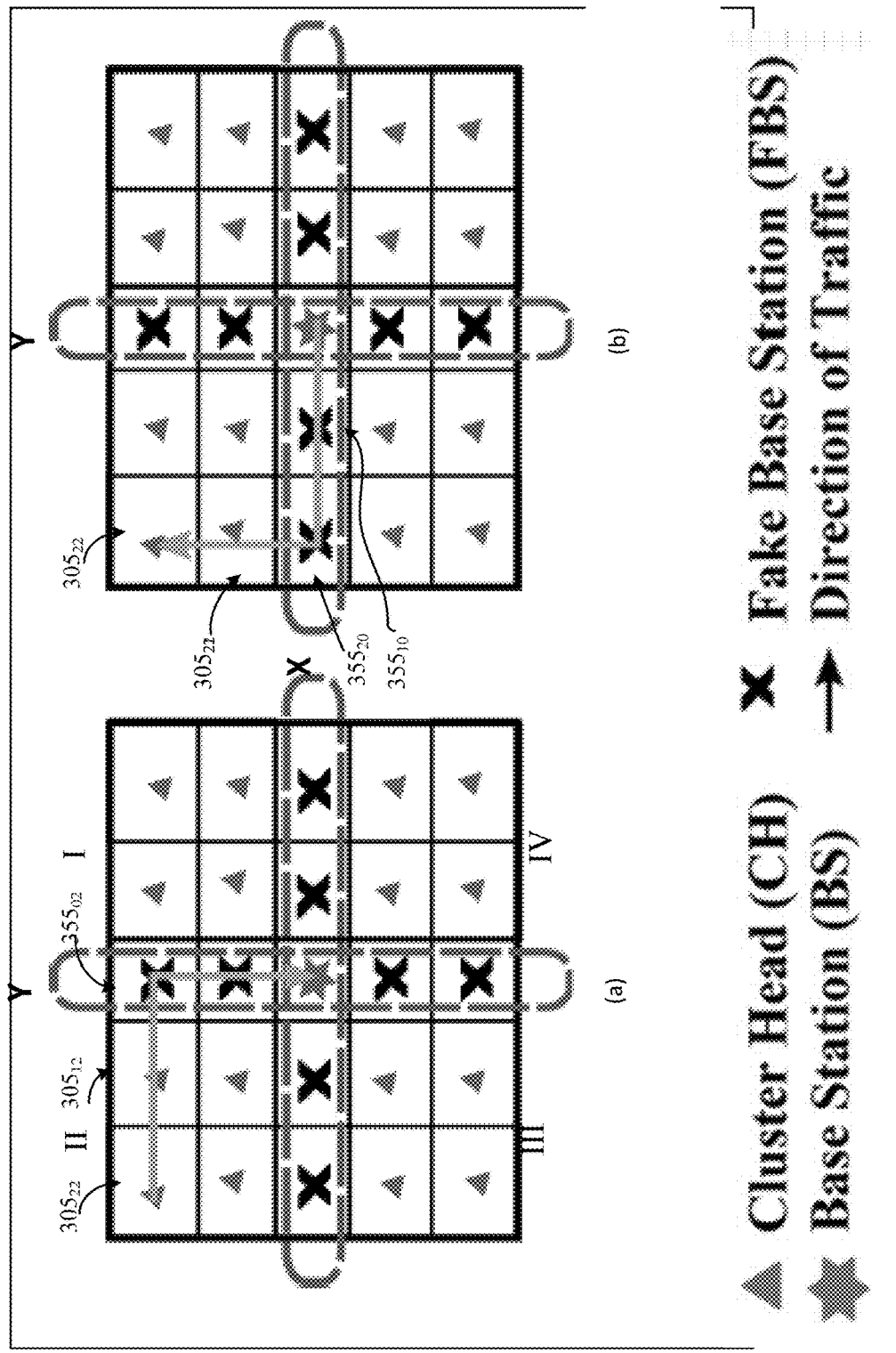
FIG. 3B illustrates the movement of packets in the network, according to certain embodiments.
Figure 3C:
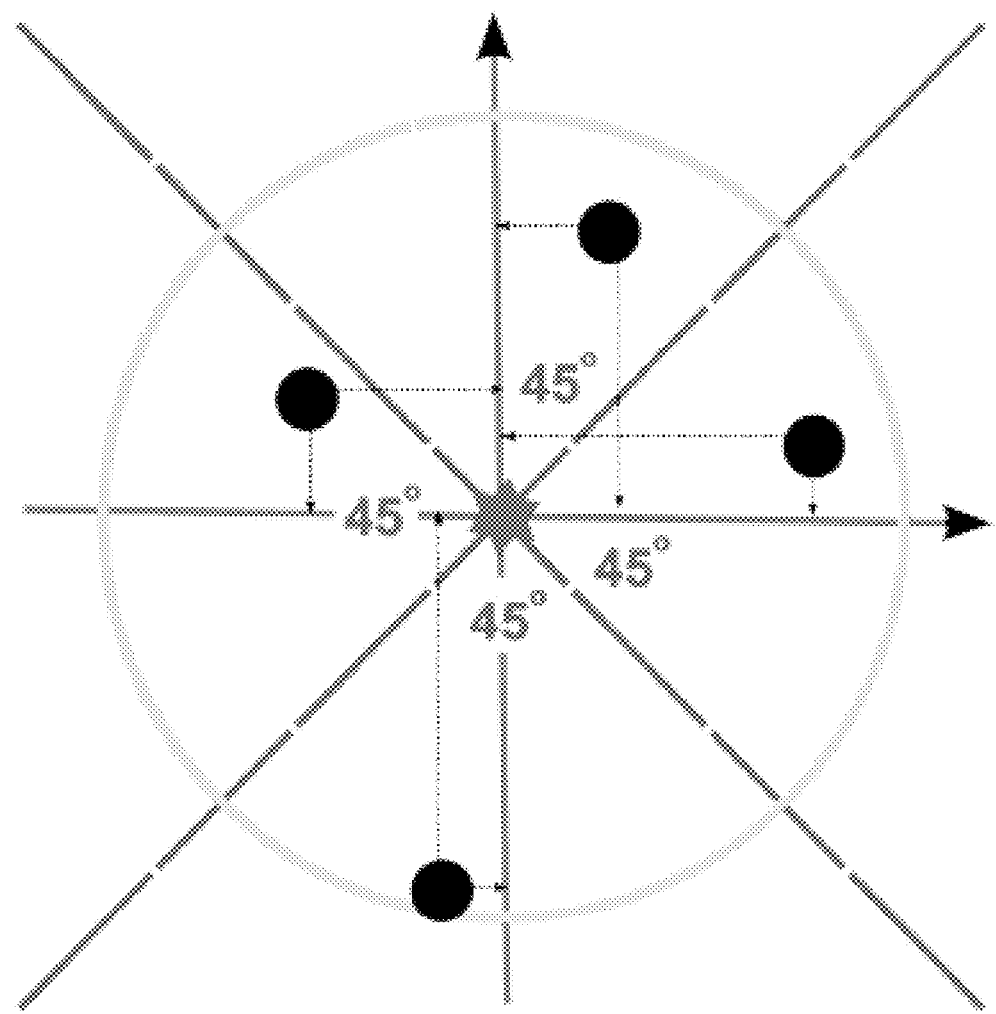
FIG. 3C illustrates the Fake Base Station selection for tunnel generation, according to certain embodiments.
Figure 3D:
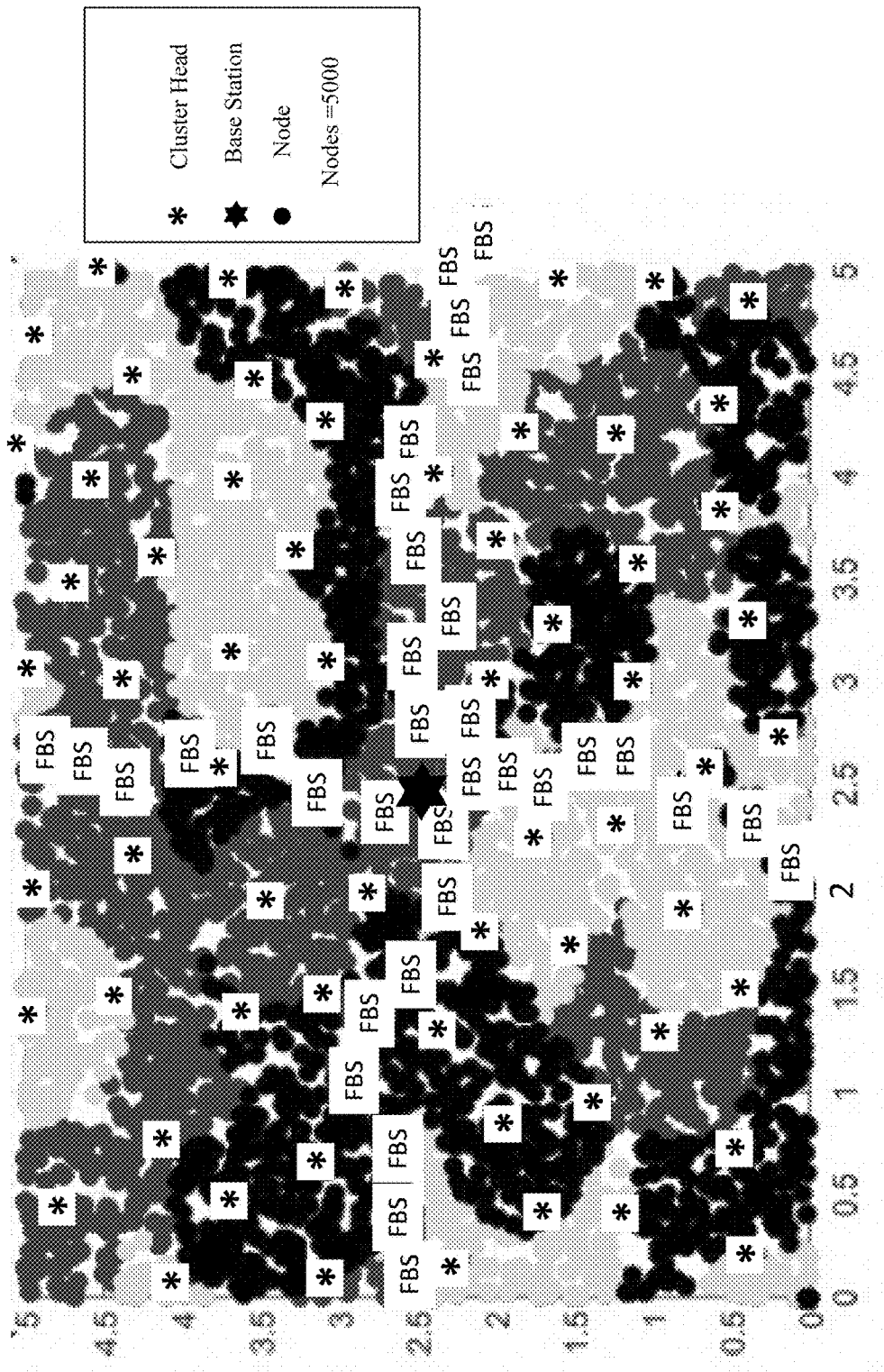
FIG. 3D demonstrates a simulated deployment of the network, according to certain embodiments.

To deceive the adversary, the Base Station 315 replies with a fake packet for every data packet received from a Cluster Head 305. As shown in FIG. 3B(b), the Base Station uses the same principle as the Cluster Head: it transmits the fake packet horizontally (along the x axis, in a third direction opposite the first direction) until it reaches the Fake Base Station $355_{20}$ aligned to the Cluster Head $305_{22}$ that originally sent the packet, then it is sent upward (for Cluster Heads in the first and second quadrants) or downwards (for Cluster heads in the third and fourth quadrants) in a fourth direction opposite the second direction, until it reaches the Cluster Head $305_{22}$ that initially sent the data packet. The fake data packet is forwarded to Cluster Head $305_{22}$ by any intermediate Cluster Heads, such as Cluster Head $305_{21}$, which are in the path between Base Station 315 and Fake Base Station $355_{20}$. Transmission of the fake data packet stops when it reaches Cluster Head $305_{22}$. This circular motion of traffic enables the network to mask the final destination of the data packets. The 5×5 grid of FIG. 3B is a non-limiting example of a grid, and is not meant to imply that there are only 25 grid positions in the Wireless Sensor Network. FIG. 3D shows a simulated Wireless Sensor Network having 5000 nodes and many cluster heads and fake base stations. The Wireless Sensor Network may include a 50×50 grid or a 100×100 grid as shown in FIGS. 5A-D and 6A-D. The number of grid positions is limited only by the transmission and processing capabilities of the base station.

The Wireless Sensor Network of the present disclosure further hides the Base Station by controlling the amount of data transmitted by the network. Clusters transmitting large amount of data are directed to lower their traffic by going to sleep as long as the percentage coverage (measured by the number of sensors in the cluster) does not exceed a predetermined value, known as the "coverThreshold", as shown in FIG. 3C. The threshold value is determined by the network administrator. It is the percentage coverage beyond which the accuracy of sensed data is affected.

The network is configured as shown in Algorithms 1 and 2:

Algorithm 1: Building Clusters

```
1   Assuming:
2   Transmission range for nodes = R
3   Transmission range for FBS = R
4   Transmission range from CH = 2R
5   All nodes choose a random number [0,ζ]
6   start internal clock
7   while (internal clock < ζ) do
8   |   listen
9   |   if        (received broadcast from node X) then
10  |   |    register X as CH turn of counter
11  |   else
12  |   |    if    (There is collision) then
13  |   |    |     start all over
14  |   |    end
15  |   end
16  end
```

Algorithm 2: Building Fake Base Stations (FBS)

```
1   Assume transmission range for nodes = R
2   Assume transmission range for FBS = R
3   Assume transmission range from CH = 2R
4   Assume No. of permissible election before accepting
    CH as FBS = p
5   BS broadcast FBS packet
6   foreach (node that receive FBS packet) do
7   |   Elect FBS in each direction
8   |   p ← p − 1
9   |   while (p > 0 AND Elected FBS is a CH) do
10  |   |    Re-elect FBS in that direction
11  |   |    p ← p − 1
12  |   |    if     (FBS was a CH) then
13  |   |    |     Concerned cluster re-elects new FBS
14  |   |    end
15  |   |    Elected FBS broadcasts FBS packet forward
16  |   end
17  end
```

Immediately after deployment, the nodes choose random numbers [0; ζ]. Each node counts down from ζ while listening. Once the counter reaches zero, the node broadcasts its ID, X, to all nodes one hop away to become members of its cluster and the cluster's ID becomes X. In the event of a collision between two nodes, the colliding nodes choose another random number and the process continues until a cluster head is chosen.

Meanwhile, the Base Station broadcasts the command to construct fake base stations (FBS) by sending the Fake Base Station packets. As shown in FIG. 3C, the nodes within the broadcast area group themselves into four directions (i.e. North, East, South and West) with a tolerance of 45°. Condition 1 generalizes the rule obeyed by each node during Fake Base Station selection so that the Fake Base Station spans along the four directions without deviation.

Condition 1. When a node N positioned at $(x_N; y_N)$ receives a Fake Base Station packet from its neighbor and has extracted the Base Station position $(x_0; y_0)$ and the transmitter is positioned at $(x_n; y_n)$. The node N can only join selection group when either $|a|>|b|$ and $c>0$ or $|c|\le|b|$ and $d>0$, but not both. Where;

$$a = x_N - x_0 \quad (2)$$

$$b = y_N - y_0 \quad (3)$$

$$c = x_N - x_n \quad (4)$$

$$d = y_N - y_n \quad (5)$$

A Cluster Head may be chosen as Fake Base Station. If the elected node has already been chosen as a Cluster Head and the re-selection has been carried out ρ number of times with the same outcome, then the supposed Cluster Head is converted to a Fake Base Station and the cluster has to choose another Cluster Head. After the election of a Fake Base Station, the Fake Base Station will in turn broadcast the Fake Base Station construction packet and nodes towards a new elected node which will participate in the Fake Base Station selection. The selection occurs iteratively until there is no node in the broadcast zone of each Fake Base Station in any of the four directions.

The nodes need localization ability (e.g. GPS, triangulation, etc.) to identify their location relative to the location of the broadcasting node and the Base Station. FIG. 3C shows the development of clusters and the Fake Base Station respectively. The solid circles represent each sensor node and the coordinates are the cluster ID of the cluster to which it belongs. An asterisk "*" represents a Cluster Head. The Base Station is shown in the figures as a large, six pointed star.

The routing technique for data transmission is now described. Algorithm 3 is used to route packets in the network. The Base Station location is known to all Fake Base Stations. When a Fake Base Station wants to transmit to the Base Station, it sends packets horizontally along (X coordinate), until it reaches the Base Station column having the X=0 coordinate of the Base Station. It then moves the packets vertically along the y-axis (along the Fake Base Stations) until it reaches the Base Station as shown in FIG. 3B(a). Similarly, the Base Station replies with a fake packet using the same algorithm. The Base Station sends the packet horizontally, along the Fake Base Station towards the original sender Cluster Head. When the Cluster Head's X coordinate is reached the packet is forwarded vertically from one Cluster Head to another until the original sender is reached, as shown in FIG. 3B(b).

```
Algorithm 3: Routing

1    X_dest ← Destination's X-coordinate
2    Y_dest ← Destination's Y-coordinate
3    X_src ← a given Source's X-coordinate
4    Y_src ← a given Source's Y-coordinate
5    i ← X_FBS
6    j ← Y_FBS
7    while (i ≠ X_dest OR j ≠ Y_dest) do
8    |    if (i < X_dest) then
9    |    |    i ← i + 1
10   |    else if (i > X_dest) then
11   |    |    i ← i - 1
12   |    else if (j > Y_dest) then
13   |    |    j ← j + 1
14   |    else if (j > Y_dest) then
15   |    |    j ← j - 1
16   |    end
17   |    Forward packet to Node(i,j)
18   end
19   Forward packet to Node(i,j)
```

Figure 3E:
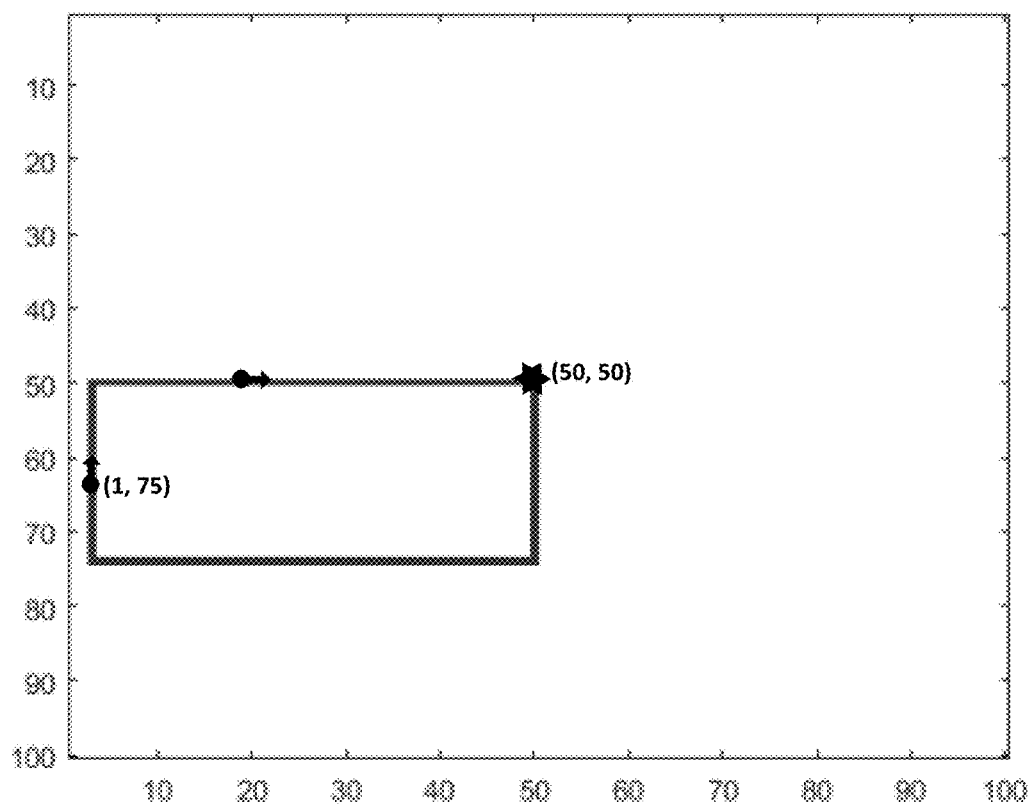
FIG. 3E illustrates routing of packets, according to certain embodiments.

FIG. 3E shows how a packet from an Fake Base Station (with the coordinate (1,75)) was sent to the Base Station (with the coordinate (50,50)). The movement in loops evades an adversary that uses packet tracing techniques, as a packet tracing attacker will always end up where it starts in the routing technique of the present disclosure. In the present disclosure, traffic is defined as the number of packets transmitted and/or received by a node per unit time τ. This metric is chosen because, from the adversary's perspective, only unintelligible data is received and sent since the whole packet has been encrypted. Therefore, the adversary can only count number of transmissions made, which is the same as the number of packets sent and/or received.

Equation 6 and 7 show the traffic equations with periodic and non-periodic transmissions to the Base Station respectively. The factor "2" represents the movement of traffic in loops. A first packet is sent by the sender to the Base Station and a second packet is the fake packet reply.

Condition 2. Traffic at the Base Station, $T_{BS}$, over a given time t, is a summation of the traffic sent by each Cluster Head per unit time $CH_i$, for all N cluster heads.

$$T_{BS} = 2t \sum_{i=1}^{N} CH_i \quad (6)$$

$$T_{BS} = 2 \sum_{i=1}^{N} \int CH_i dt \quad (7)$$

In an aspect of the present disclosure, the traffic in the network is controlled in order to avoid traffic volume analysis by an adversary.

After a period of pre-programmed time, τ, the Base Station uses Algorithm 4 (shown below) to decrease traffic in areas with high traffic without affecting the coverage of the sensors in the region. A region is described as an area sensed by one or more cluster of nodes.

```
Algorithm 4: Traffic Management technique

/* Largest changes to lowest, ID_lower
changes to ID_heighten and lowlevel
changes to highlevel when algorithm
is used in heightening traffic */
1    β ← Cover Threshold value
2    lowlevel ← Maximum level of lowering
3    ID_lower ← lowlevel
4    N ← CH with the largest traffic
5    while (ID_lower > 0 OR CH ≠ φ) do
6    |    x ← no. of nodes in N
```

-continued

| Algorithm 4: Traffic Management technique |
|---|
| 7      y ← no. of nodes in all cluster in region of N |
| 8      z ← x/y × 100      // percentage coverage |
| 9      if (z ≤ β) then |
| 10          N is assigned $ID_{lower}$ |
| 11          $ID_{lower} \leftarrow ID_{lower} - 1$ |
| 12      end |
| 13      N ← CH with the next largest traffic |
| 14 end |

The clusters with highest traffic are given the highest identifiers (IDs) from $ID_{lower}$, to direct how many divisions into which they will divide their original traffic to obtain the expected traffic for the cluster. The identifier is directly proportional to the traffic of the Cluster Head to which it is assigned. This means that the amount of traffic lowered by each Cluster Head is proportional to the amount of total traffic generated by Cluster Head since deployment is compared to the nodes in the network. Traffic from a Cluster Head may be lowered by directing redundant nodes to sleep or shut down for time period τ. Alternatively, traffic may be lowered by increasing the delay in transmitting aggregated data packets.

Conversely, in an algorithm similar to Algorithm 4, in which lines 4 and 13 are used to search for the Cluster Head with the highest traffic, lines 4 and 13 are modified to the search for the Cluster Head having the lowest traffic in the network. In this situation, the cluster with the lowest traffic is given an ID from $ID_{heighten}$ that directs it to produce traffic in multiples of the ID, thereby increasing the traffic at the given Cluster Head. The Cluster head may either duplicate the packets, which yields the benefit of hiding the station as well as enhancing the reliability of the transmission in situations of high packet drop. Alternatively, the Cluster Head may inject dummy packets to increase the overall transmission rate.

Line 9 of Algorithm 4 ensures that clusters covering β out of 100 of the region are unaffected by the anonymity technique. This means that even if network were to fail due to the energy overhead incurred by the security layer, some part of the network will still provide services.

In each situation, ($ID_{lower}$ and $ID_{heighten}$), no two nodes have the same ID value. The Base Station stops assigning either $ID_{lower}$ or $ID_{heighten}$ when it depletes its storage of IDs. This means $1-(ID_{heighten}/(ID_{lower}+ID_{heighten}))$ of the network will be lowered and $ID_{heighten}/(ID_{lower}+ID_{heighten})$ will be heightened from one T unit of time to another. The heightening ID, $ID_{heighten}$, is given higher priority because lowering traffic does not guarantee an anonymous Base Station for a large network. Condition 3 describes the traffic ID in more detail.

Condition 3. Suppose a network with (Cluster Head$_{total}$) Cluster Heads is programmed with $ID_{lower}$ and $ID_{heighten}$, then γ is the number of Cluster Heads which remain unassigned to lower or heighten their traffic:

$$ID_{lower} \leq CH_{total} \quad (8)$$

$$ID_{heighten} \leq CH_{total} \quad (9)$$

$$\gamma = MAX(0, CH_{total} - (ID_{lower} + ID_{heighten})) \quad (10)$$

$$Pct_{unassigned} = \frac{\gamma}{CH_{total}} \times 100 \quad (11)$$

$$Pct_{heighten} = \frac{ID_{heighten}}{CH_{total}} \times 100 \quad (12)$$

$$Pct_{lower} = \frac{CH_{total} - (\gamma + ID_{heighten})}{CH_{total}} \times 100 \quad (13)$$

Below are described the simulations that were carried out to investigate the behavior of the Wireless Sensor Network and its efficacy in eluding attacks from an adversary.

To investigate how the Wireless Sensor Network behaves in real settings, the network was simulated using Matlab. Two simulations were carried out; a grid of 100-by-100 nodes and a grid of 50-by-50 nodes.

Belief Theory is applied using the settings described with respect to the adversary model. Belief Theory is also applied to the network with the proposed routing and network configuration but without the anonymity technique of Algorithm 4. This configuration is denoted the Baseline configuration, and serves as a control to the simulation it as gives an insight to the ability of the attacker to detect the Base Station had there been no anonymity technique added to the system. Results of the simulations are analyzed and discussed.

Figure 5A:
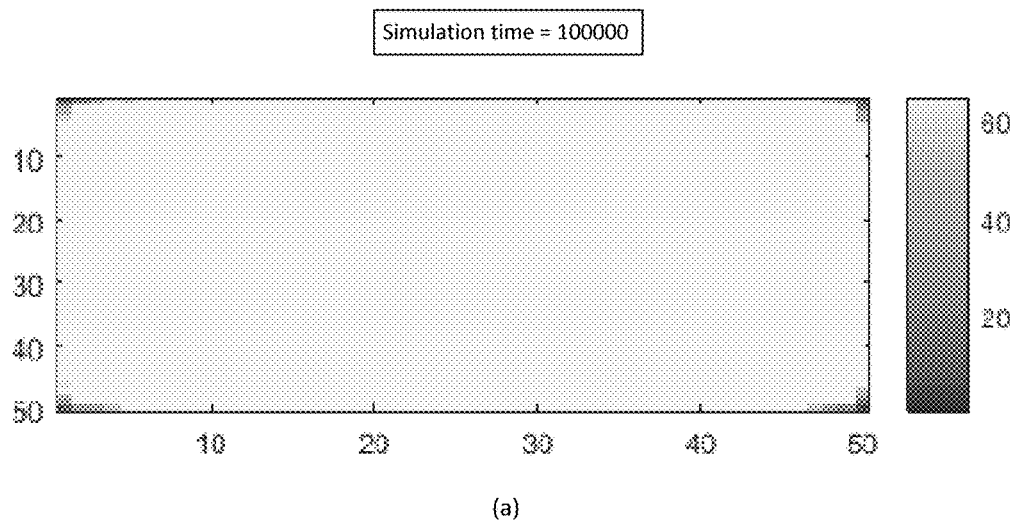
FIG. 5A depicts the baseline traffic volume for a 50×50 grid, according to certain embodiments.
Figure 5A:
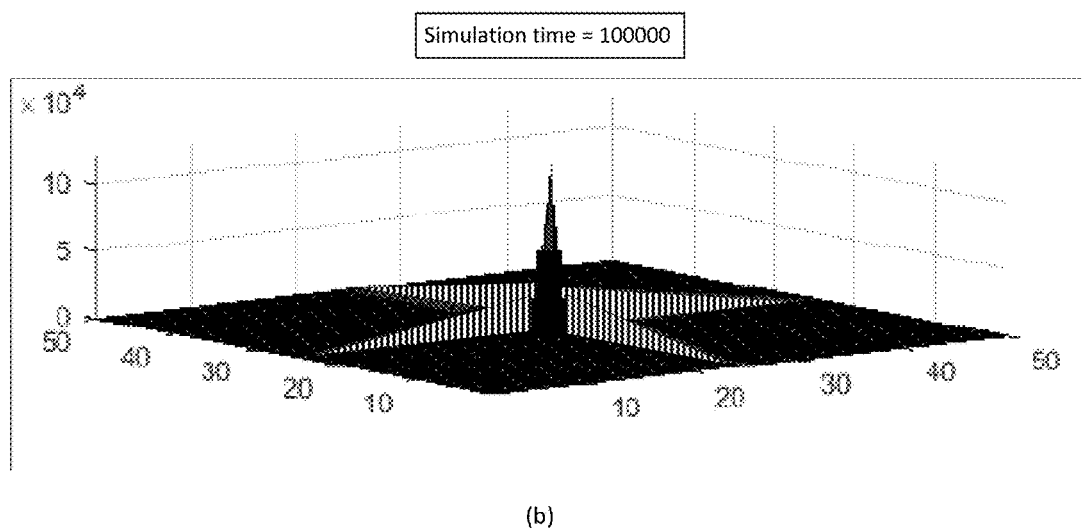
Figure 5B:
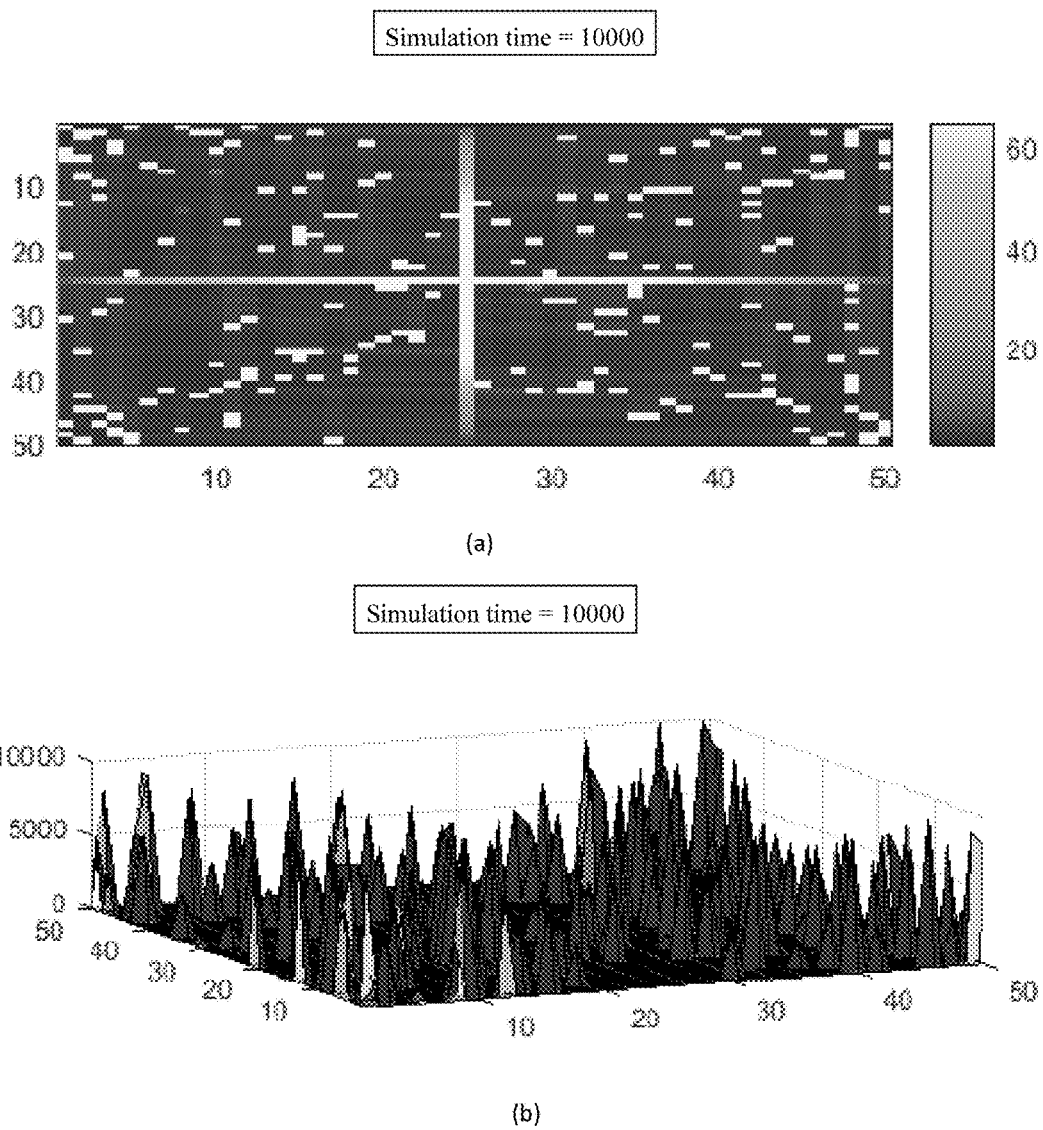
FIG. 5B depicts the traffic volume for a 50×50 grid after application of anonymity, according to certain embodiments.
Figure 5C:
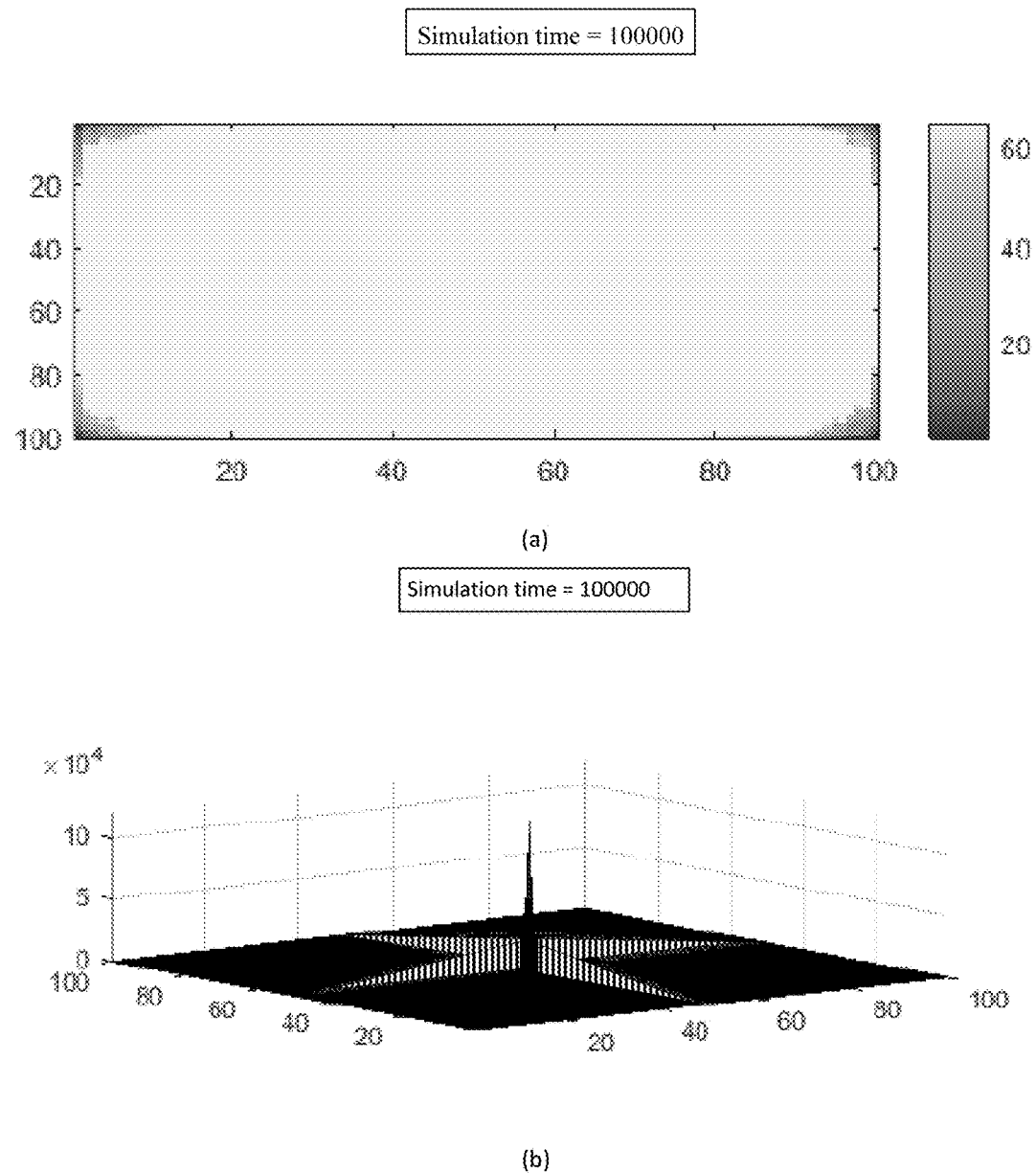
FIG. 5C depicts the baseline traffic volume for a 100×100 grid, according to certain embodiments.
Figure 5D:
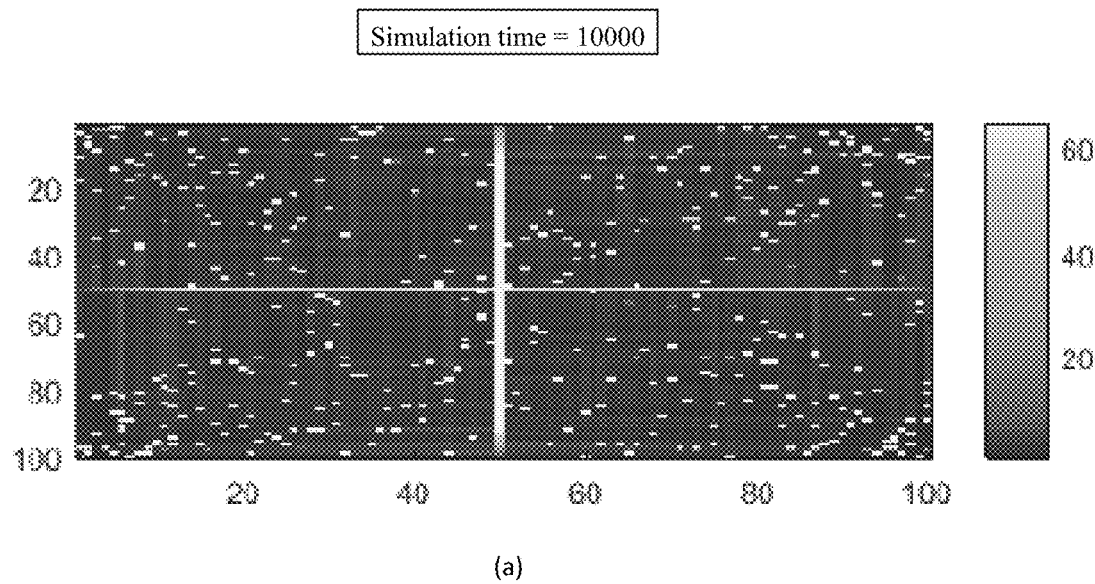
FIG. 5D depicts the traffic volume for a 100×100 grid after application of anonymity, according to certain embodiments.
Figure 5D:
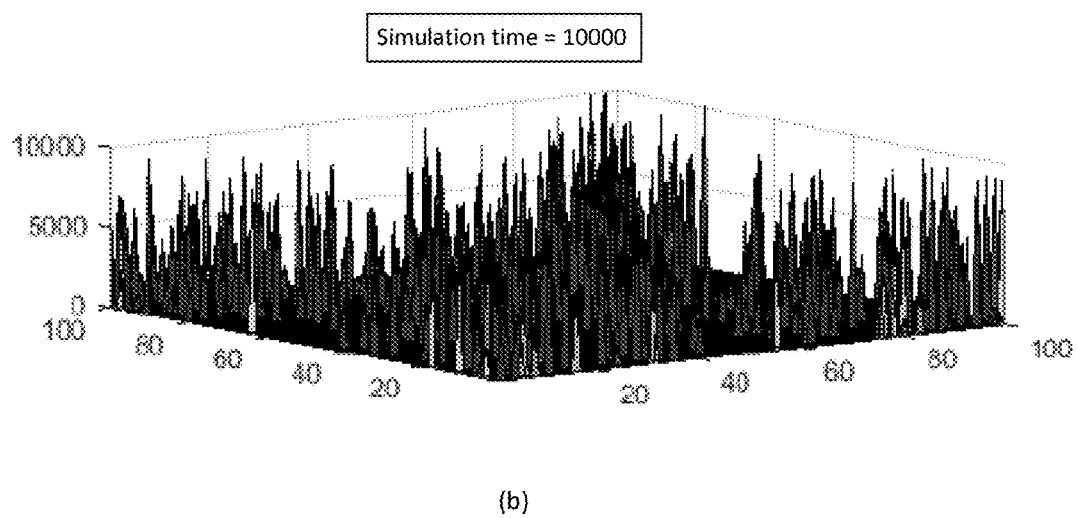

FIGS. 5B and 5D illustrate the network's traffic volume using the anonymity technique while FIGS. 5A and 5C depict the baseline traffic volume without the anonymity technique for 50×50 and 100×100 grid networks respectively. The baseline (see 5B, 5D) shows an increase in traffic along the four sets of Fake Base Stations. However, the traffic at the center, where the Base Station resides increases exponentially. This is due to the fact that all traffic is directed to the Base Station as described by Equation 6 and 7. With the application of the anonymity technique, it can be seen that the Base Station is hidden. The technique is also able to increase the traffic, especially at the edges where there is barely any traffic in the baseline. This is achieved due to the fact that the each Cluster Head behaves as a Base Station to the sensors; it aggregates the data from the sensors it serves, and sends it as a single packet. For example a Cluster Head with 10 nodes in its cluster may receive 20 packets of traffic during an event. The Cluster Head then aggregates the 20 packets into one packet which is then sent to the Base Station. Therefore, if the number of packets sent by the sensors is more than the number of Cluster Heads sending data to the Base Station at a given time, the Base Station will be undistinguishable from the Cluster Heads and Fake Base Stations. Another advantage stems from the fact that the Wireless Sensor Network sends packets from nodes that contribute less to the coverage of the sensed environment by routing the packets away from the originating Cluster Head. Additionally, the network is able to keep the maximum traffic of the Cluster Heads close to that of the baseline, because locations with high traffic are asked to lower their traffic. Sensing in these high volume locations will remain accurate when some of the sensors are directed to sleep as data from the sleeping sensors would be redundant. This also helps the network manage its energy consumption, since any reduction in traffic will result to a proportional drop in energy consumption. In addition, the larger the number of nodes in the network, the more distributed is the traffic overhead, because the proposed system always ensures that traffic evens out within the network.

Figure 6A:
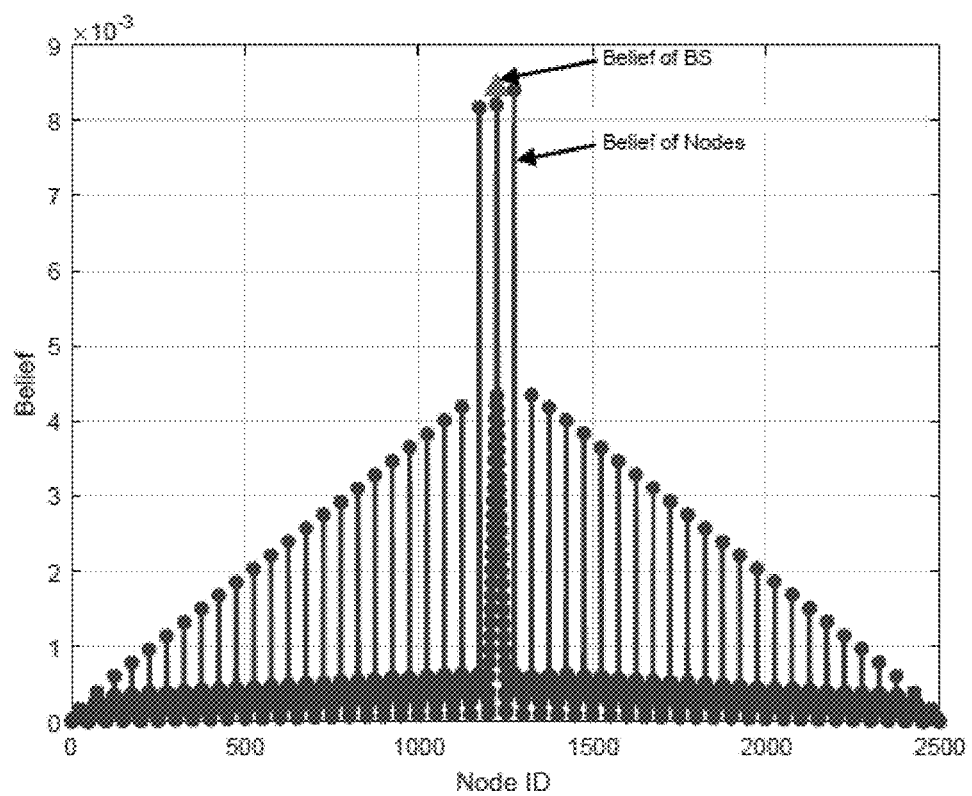
FIG. 6A depicts the baseline node ID versus belief values for a 50×50 grid, according to certain embodiments.
Figure 6B:
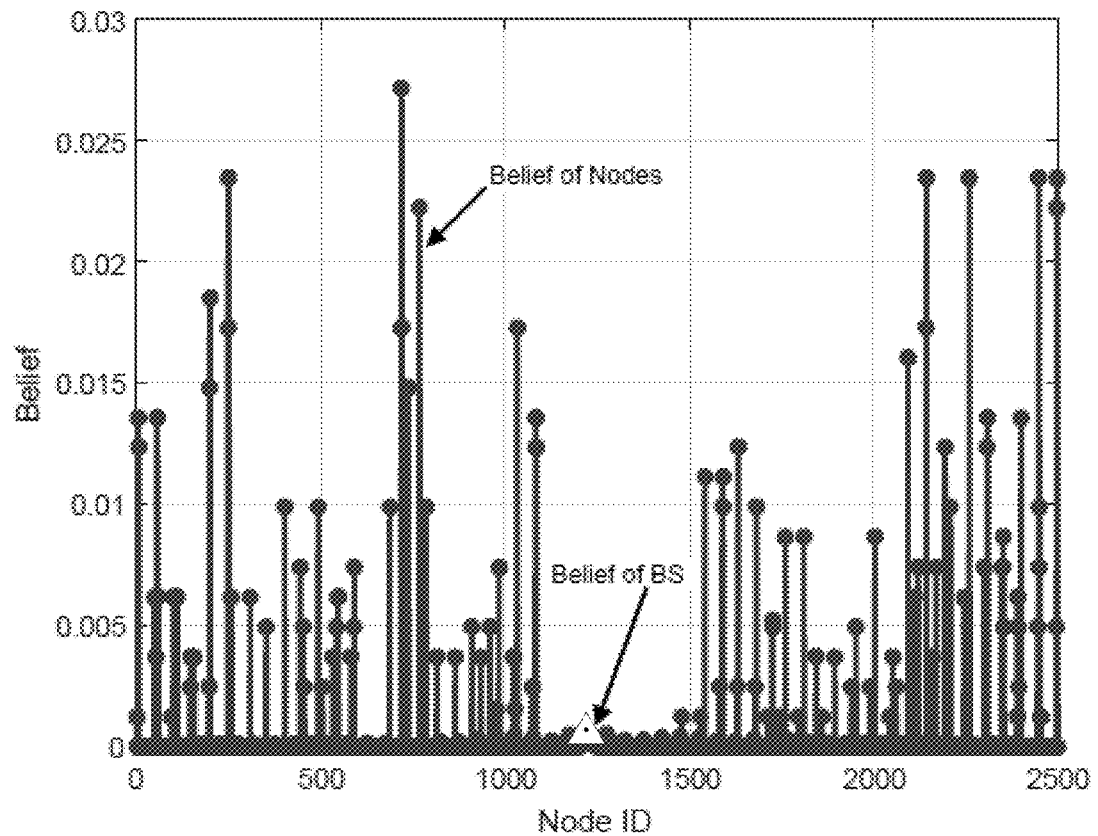
FIG. 6B depicts the traffic volume for a 50×50 grid after application of anonymity, according to certain embodiments.
Figure 6C:
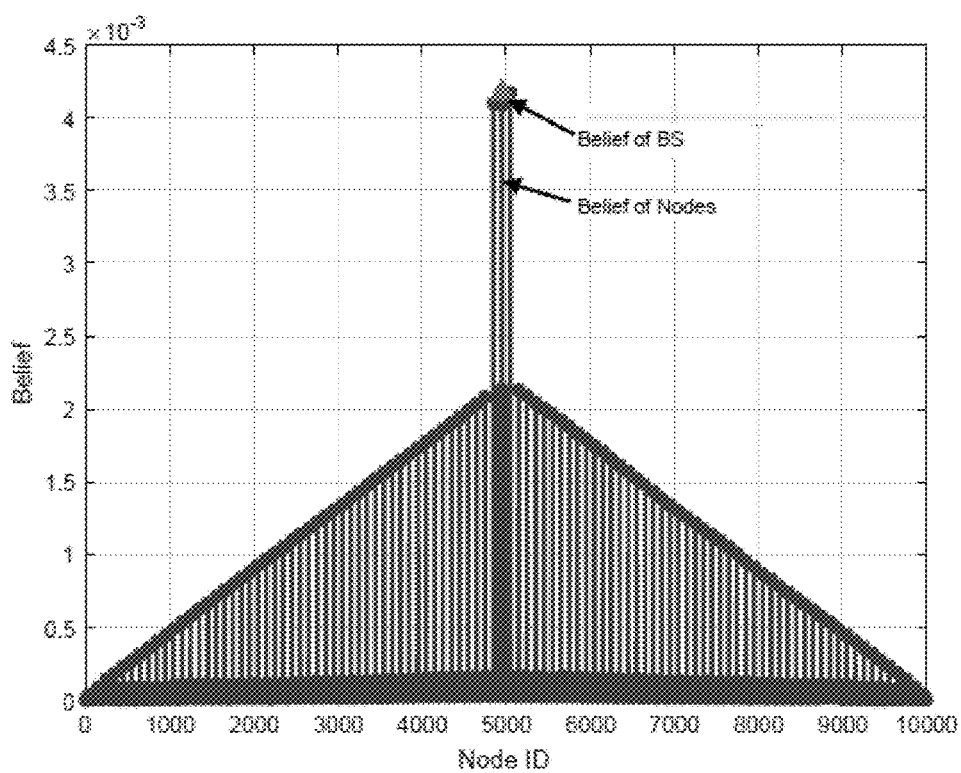
FIG. 6C depicts the baseline node ID versus belief values for a 100×100 grid, according to certain embodiments.

FIGS. 6A and 6C show the belief values for each Cluster Head in the network. It is clear to an adversary that the Base Station is the node at the center. In this context, belief theory is the probability that all neighboring nodes forward data to the same node. Based on the patterns shown in the two figures, it is clear that the belief is higher near the Base Station. Also, the belief is a measure of the traffic volume of a node relative to other nodes in the network that forward packets to it. An Adversary would be able to detect the position of the Base Station without anonymity as shown in FIG. 5A, 5C using Belief Theory, but would not be able to detect the Base Station with applied anonymity as shown in FIG. 5B, 5D.

Figure 6D:
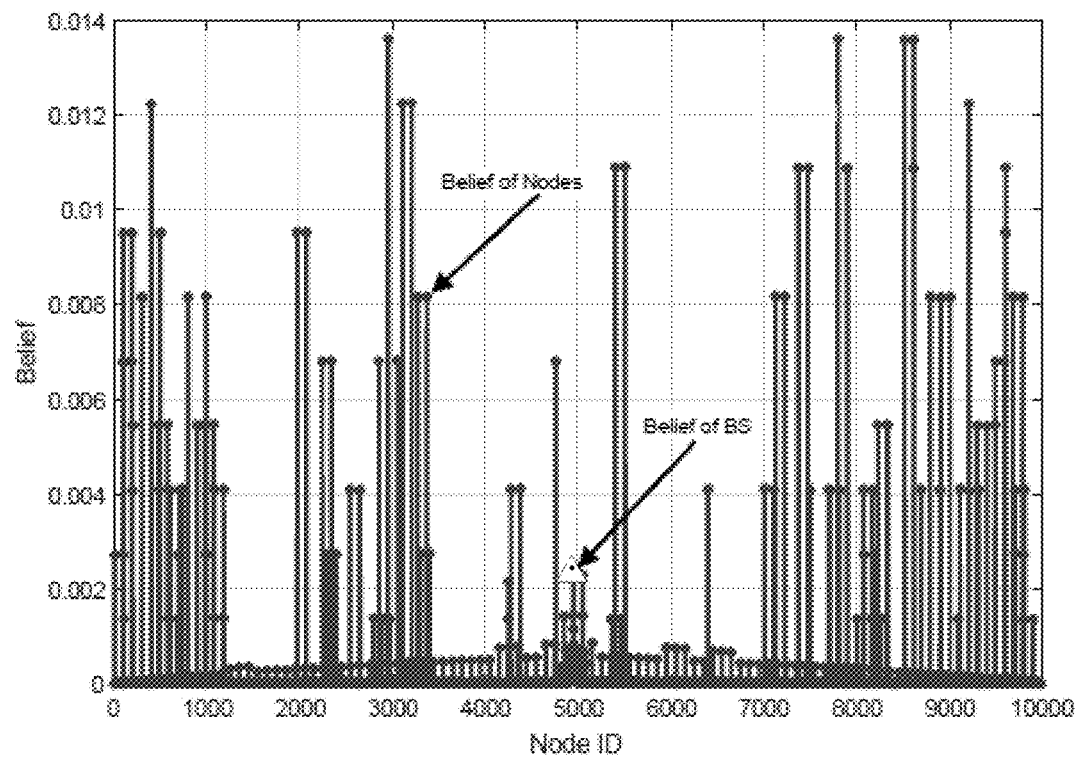
FIG. 6D depicts the node ID versus belief values for a 100×100 grid after application of anonymity, according to certain embodiments.

FIGS. 6B and 6D show the belief values of the 50-by-50 and the 100-by-100 network after the application of the anonymity methods of the present disclosure. The success in anonymity hinges solely on the fact that there is no correlation between the amount of traffic generated at the Cluster Head due to sensor data sent to it and the traffic generated at the Base Station due to traffic sent by the Cluster Heads. Irrespective of the number of packets sent to the Cluster Head, all data is aggregated and one packet is sent to the Base Station. However, it can be seen that the larger the network, the less anonymous is the Base Station, when one looks at the belief values in FIGS. 6B and 6D. The higher density network of FIG. 6D clearly shows a small belief value at Base Station position. As shown in Equations 6 and 7, traffic at the Base Station is proportional to the number of Cluster Heads (N), therefore a greater number of Cluster Heads generate more traffic towards the Base Station. Alternatively, the larger the number of Cluster Head the larger the number of the Cluster Heads with traffic greater than or equal to the traffic of the Base Station. For anonymity, the maximum traffic should be less than 10,000 packets.

Figure 4:
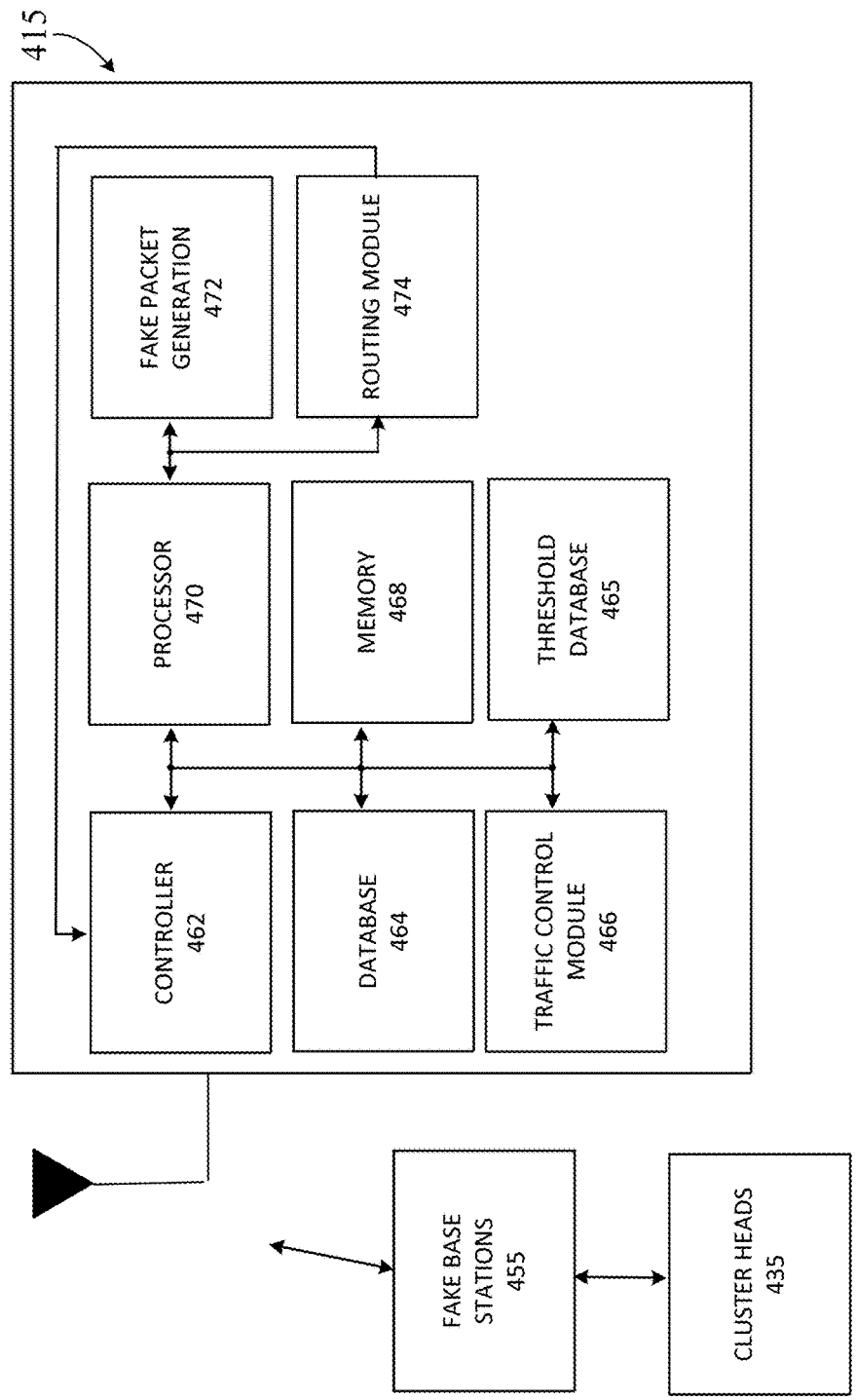
FIG. 4 is an exemplary controller for base station anonymity, according to certain embodiments.

A first embodiment to a wireless sensor network for providing base station anonymity is shown in FIGS. 3A, 3B and 4. The wireless sensor network comprises a plurality of sensor nodes 325 having circuitry configured to transmit nodal data along communication channel 330; a plurality of cluster heads 305, wherein the plurality of cluster heads are arranged in a grid configuration 335, the grid having a center point (0, 0), a first axis (x), a second axis (y) and a boundary, wherein the first axis and the second intersect at the center point of the grid and extend to the boundary defined by the number of nodes in the network. The first axis and the second axis are perpendicular to one another and form four quadrants I, II, III and IV, as shown in FIG. 3A, 3B.

A plurality of fake base stations 355, denoted as X, are arranged along the first and second axes of the grid configuration and base station 315 is located at the center point of the grid configuration.

Each cluster head has circuitry configured to receive nodal data packets over communication channel, one of which is indicated at 330, from a unique set of sensor nodes (see each grid position containing a set of sensor nodes 325 in FIG. 3A) chosen from the plurality of sensor nodes (all sensor nodes 325 in the lower grid of FIG. 3A), aggregate the nodal data packets to originate an aggregated data packet, and transmit the aggregated data packet to at least one of a fake base station and an adjacent cluster head (see FIG. 3B(a)).

Each fake base station 355 has circuitry configured to receive an aggregated data packet from a cluster head and transmit the aggregated data packet toward the base station 315 (along they axis as shown in FIG. 3B(a)).

The base station 315 has circuitry configured to generate a fake data packet upon receiving a data packet originating from a cluster head and transmit the fake data packet in a direction along the first axis to a fake base station, wherein the direction along the first axis is towards the location in the grid of the cluster head which originated the aggregated data packet (see fake data packet transmitted from the base station to a fake base station adjacent and to the left of the base station as shown in FIG. 3B(b)). The direction of transmission of the aggregated data packet towards the fake base station is antiparallel to the direction of transmission of the fake data packet along the first axis, and the direction of transmission of the fake data packet along the second axis is antiparallel to the direction of transmission of the fake data packet from the fake base station aligned with the originating cluster head and the originating cluster head.

Each fake base station 355 has circuitry configured to receive at least one of an aggregated data packet and a fake data packet and to transmit the at least one of an aggregated data packet and a fake data packet to at least one of a fake base station 355, a cluster head 305 or the base station 315.

The grid includes a first quadrant (I), a second quadrant (II), a third quadrant (III) and a fourth quadrant (IV) defined by the first and second axes. Each quadrant includes a rectangular division of grid positions, the rectangular grid divisions defining rows and columns.

Each cluster head in a quadrant has circuitry to transmit an aggregated data packet along a row of the grid to either a first adjacent cluster head in the direction of the second axis or to a fake base station on the second axis, such that the first adjacent cluster head receives and forwards the aggregated data packet toward at least one of a next adjacent cluster head in the row in the direction of the fake base station or toward the fake base station, or the fake base station receives the aggregated data packet as shown and described above with respect to FIG. 3B(a).

Each sensor node 325, cluster head 305 and fake base station 355 includes circuitry to determine its location and the location of the sensor nodes, cluster heads, false base stations and the base station 315.

Each cluster head 305 receives nodal data from a set of nodes 325 of the plurality of nodes, the set of nodes capable of transmitting data to the cluster head at a predetermined amplitude and frequency.

Each sensor node further has circuitry configured to cause the sensor to turn off or sleep for a time period. Each base station 315 further has circuitry configured to transmit a command directing the sensor node to turn off for a time period τ. Each sensor node has circuitry configured to receive the command and to turn off for the time period, τ.

Each cluster head 305 has circuitry configured to lower its traffic by at least one of delaying the transmission of aggregated data packets and ceasing transmission for a time period, τ. Further, each cluster head has circuitry configured to increase its traffic by dividing each aggregated data packet into two or more aggregated data packets.

As shown in FIG. 4, the base station 415 has circuitry including a processor 470 using program instructions stored in memory 468 which are configured to analyze the wireless network traffic in order to determine the traffic originating from each cluster head (see Traffic Control Module 466); compare the traffic from each cluster head to a threshold, coverThreshold, stored in Threshold Database 465, determine the traffic threshold needed at each cluster head to obscure the location of the base station; and direct, using Routing Module 474, the cluster heads 455 having traffic lower than the threshold to lower their traffic; and direct the cluster heads 435 having traffic higher than the threshold to increase their traffic.

A second embodiment to a method for providing base station anonymity in a wireless sensor network is shown in FIGS. 3A, 3B and 4.

The method comprises receiving, at an originating cluster head 335, at least one nodal data packet from at least one of a plurality of sensor nodes during a time period τ; combining the nodal data packets to form an aggregated data packet; transmitting, by the cluster head, the aggregated data packet in a first direction toward a first fake base station; receiving, by the first fake base station, the aggregated data packet; transmitting, by the fake base station, the aggregated data packet in a second direction toward the base station as shown in FIG. 3B(a). The method continues by receiving, by the base station, the aggregated data packet.

The base station generates a fake data packet and transmits the fake data packet in a third direction toward a fake base station, the third direction antiparallel to the first direction as shown in FIG. 3B(b).

When the fake data packet reaches a fake base station which is in the same column as the originating cluster head, the fake base station transmits the fake data packet in a direction antiparallel to the second direction, until the fake data packet is received by the originating cluster head. At his point, the forwarding of the fake data packet ceases.

In the second embodiment, the cluster heads, fake base stations and base station are arranged in a rectangular grid configuration, the grid having a center, a first axis, x, perpendicular to a second axis, y, the first and second axis intersecting at the center of the rectangular grid, and each grid position is defined by a unique set of coordinates, (x, y).

The fake base stations are positioned on the x and y axes, the base station is positioned at the center, and the cluster heads are positioned at grid positions not including the center and the x and y axes.

The base station, for an originating cluster head located at coordinate position (a, b), the fake data packet along the first axis in the direction of a to a fake base station adjacent to the base station. The method includes determining whether the adjacent fake base station is positioned at the coordinate (a, 0); if the adjacent fake base station is at the position (a, 0), transmitting, by the fake base station, the fake data towards a first adjacent cluster head in the b direction. If the adjacent fake base station is not at the position (a, 0), forwarding, by the adjacent fake base station, the fake data packet along the first axis to intermediate fake base stations in the direction of a until the fake data packet is received by a fake base station located at the coordinates (a, 0), then transmitting, by the fake base station, the fake data towards a first adjacent cluster head in the b direction.

The method continues by determining whether the first adjacent cluster head is at the position (a, b), and if the first adjacent cluster head is at position (a, b), stop transmitting the fake data packet. If the first adjacent cluster head is not at position (a, b), forwarding the fake data packet by intermediate cluster heads until the fake data packet reaches the originating cluster head at (a, b); and then stop transmitting the fake data packet.

The wireless sensor network provides anonymity for the base station by hiding the base station. This is partially realized by identifying cluster heads which are transmitting high volumes of traffic and instructing an identified cluster head to sleep for a period of time.

The wireless sensor network further provides anonymity for the base station by the base station determining the traffic originating from each cluster head, determining a traffic threshold needed at each cluster head to obscure the location of the base station, comparing, by the base station, the traffic at each cluster head to the traffic threshold, and commanding the cluster heads having traffic lower than the threshold to lower their traffic; wherein lowering traffic comprises commanding nodes to sleep.

For cluster heads having traffic higher than the threshold, the base station commands those cluster heads to increase their traffic, wherein increasing traffic comprises dividing an aggregated data packet into two or more packets. The results of a simulation showing the results for hiding the base station by this method are shown in FIGS. 5B and 5D. It is clear from these figures that an adversary cannot identify the base station by examining the traffic profile of the network.

FIGS. 3A, 3B and 4 illustrate a third embodiment to a non-transitory computer readable medium having instructions stored therein that, when executed by one or more processors, causes the one or more processors to perform a method for providing base station anonymity in a wireless sensor network comprises receiving, at an originating cluster head, at least one nodal data packet from at least one of a plurality of sensor nodes during a time period τ; combining the nodal data packets to form an aggregated data packet; transmitting, by the cluster head, the aggregated data packet in a first direction toward a first fake base station; receiving, by the first fake base station, the aggregated data packet; transmitting, by the fake base station, the aggregated data packet in a second direction toward the base station; receiving, by the base station, the aggregated data packet; generating, by the base station, a fake data packet; transmitting, by the base station, the fake data packet in a third direction toward a fake base station, the third direction antiparallel to the first direction; forwarding, by fake base station, the fake data packet in a direction antiparallel to the second direction, until the fake data packet is received by the originating cluster head, then ceasing the forwarding of the fake data packet.

arranging the cluster heads, fake base stations and base station in a substantially rectangular grid configuration, the grid having a center, a first axis, x, and a second axis, y, the second axis perpendicular to the first axis, wherein the first and second axis intersect at the center, As shown in FIG. 3B, the rectangular grid includes a first quadrant, a second quadrant, a third quadrant and a fourth quadrant defined by the first and second axes. Each quadrant includes a rectangular division of grid positions, the rectangular grid divisions defining rows and columns; wherein each grid position on the rectangular grid is defined by a corresponding set of coordinates, (x, y). The fake base stations are positioned at grid positions on the rectangular grid on the x and y axes, wherein the base station is positioned at the center of the rectangular grid, and wherein the cluster heads are positioned at grid positions on the rectangular grid not including the center and the x and y axes.

The third embodiment further provides for base station anonymity by the base station transmitting, for each cluster head located at coordinate position (a, b), the fake data packet along the first axis in the direction of a; receiving, by a fake base station adjacent to the base station, the fake data packet, determining whether the adjacent fake base station is positioned at the coordinate (a, 0); if the adjacent fake base station is at the position (a, 0), transmitting, by the fake base station, the fake data towards a first adjacent cluster head in the b direction. If the adjacent fake base station is not at the position (a, 0), forwarding, by the adjacent fake base station, the fake data packet along the first axis by intermediate fake base stations in the direction of a until the fake data packet is received by a fake base station located at the coordinates (a, 0), then transmitting, by the fake base station, the fake data towards a first adjacent cluster head in the b direction; determining whether the first adjacent cluster head is at the position (a, b), if the first adjacent cluster head is at position (a, b), stop transmitting the fake data packet. If the first adjacent cluster head is not at position (a, b), forwarding the fake data packet to intermediate cluster heads until the fake data packet reaches the originating cluster head at (a, b); and then stop transmitting the fake data packet.

Traffic within the network is managed by the non-transitory computer medium of the base station, by the base station determining the traffic originating from each cluster head; determining a traffic threshold needed at each cluster head to obscure the location of the base station; comparing, by the base station, the traffic at each cluster head to the traffic threshold. The base station controller 462 commands the cluster heads having traffic lower than the threshold to lower their traffic by commanding nodes to sleep; and commands the cluster heads having traffic higher than the threshold to increase their traffic, wherein increasing traffic comprises dividing an aggregated data packet into two or more packets.

An anonymity method is disclosed to evade traffic volume attacks. A Wireless Sensor Network routes packets in a rectangular loop pattern in order to avoid packet tracking attacks in which the attackers are considered to be global adversaries. The network generates more traffic (by use of Fake packets) in order to counter the cumulative effect of traffic from all over the network towards the Base Station. The network signals Cluster Heads with low traffic to increase their traffic and Cluster Heads with high traffic to reduce their traffic, thereby ensuring uniform traffic and disguising the Base Station from an attacker. Increasing network traffic overall ensures anonymity, while lowering traffic in higher volume areas increases energy efficiency since lowering traffic results in lower energy consumption. Finally, the network places a Cluster Head in each cluster to ensure the coverage of the cluster (and by extension the accuracy of the measurement in the region), where the Cluster Heads are not hidden, which directs notice away from the Base Station. This ensures that even if nodes hiding the Base Station are asleep or non-functional, the Wireless Sensor Network will continue to be operational.

Figure 7:
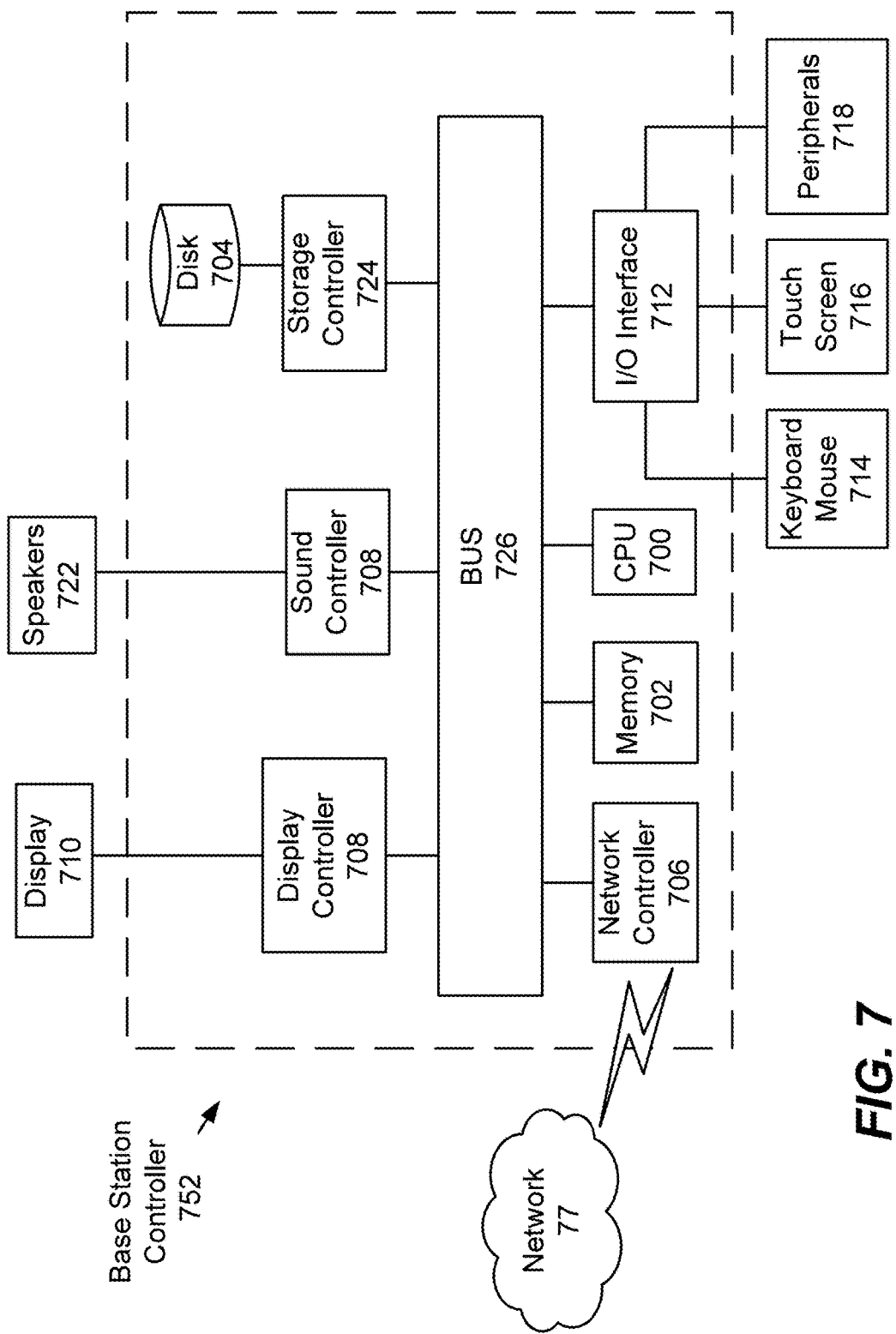
FIG. 7 is an exemplary illustration of computing hardware used in the control units of the exemplary embodiments.

Next, a hardware description of the Base Station controller 762 according to exemplary embodiments is described with reference to FIG. 7. In FIG. 7, the controller 752 described is representative of the Base Station controller 462 of FIG. 4, in which the controller is a computing device which includes a CPU 700 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer. Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN subnetworks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
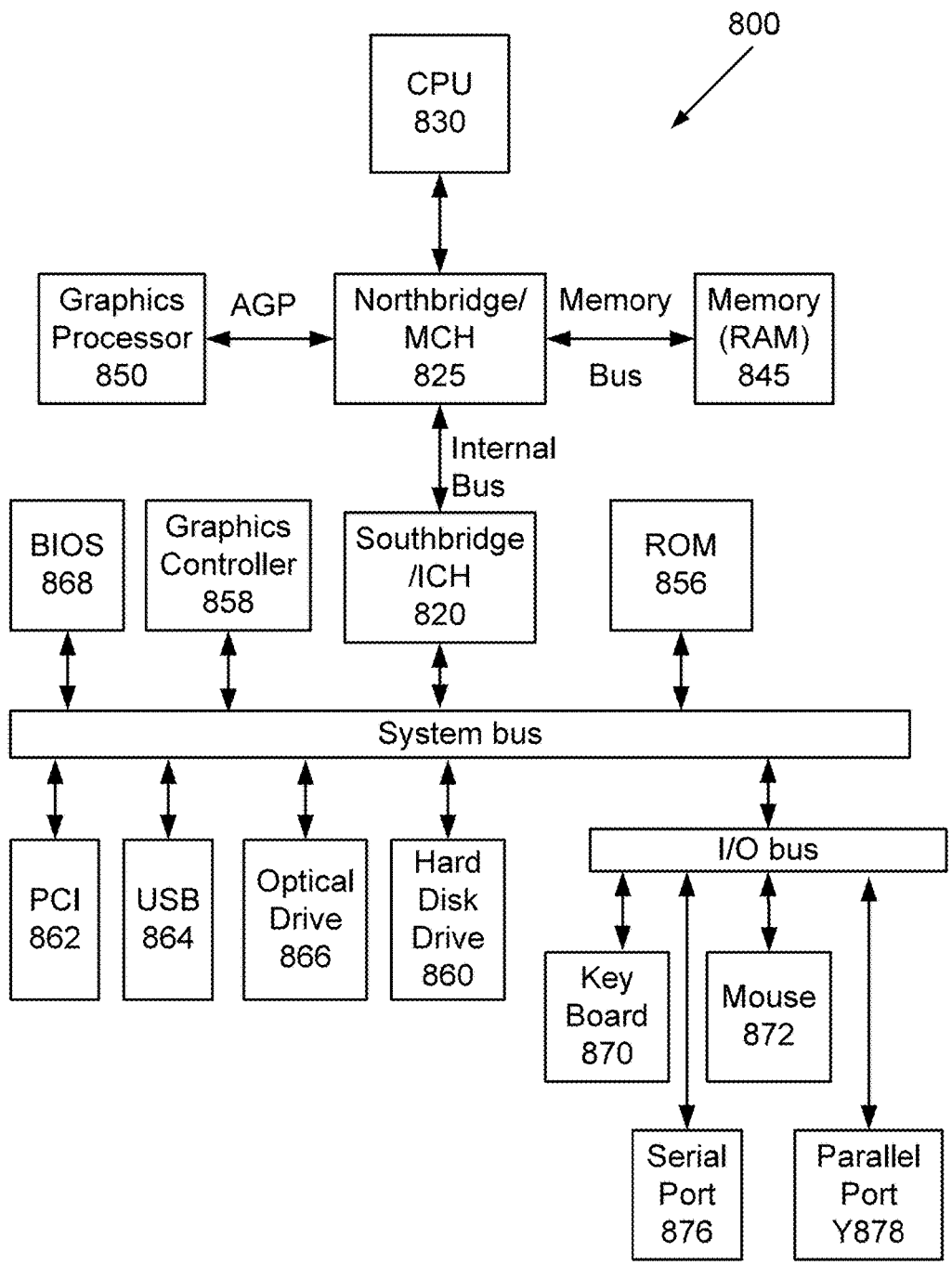
FIG. 8 is an exemplary schematic diagram of a data processing system used within the control units, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
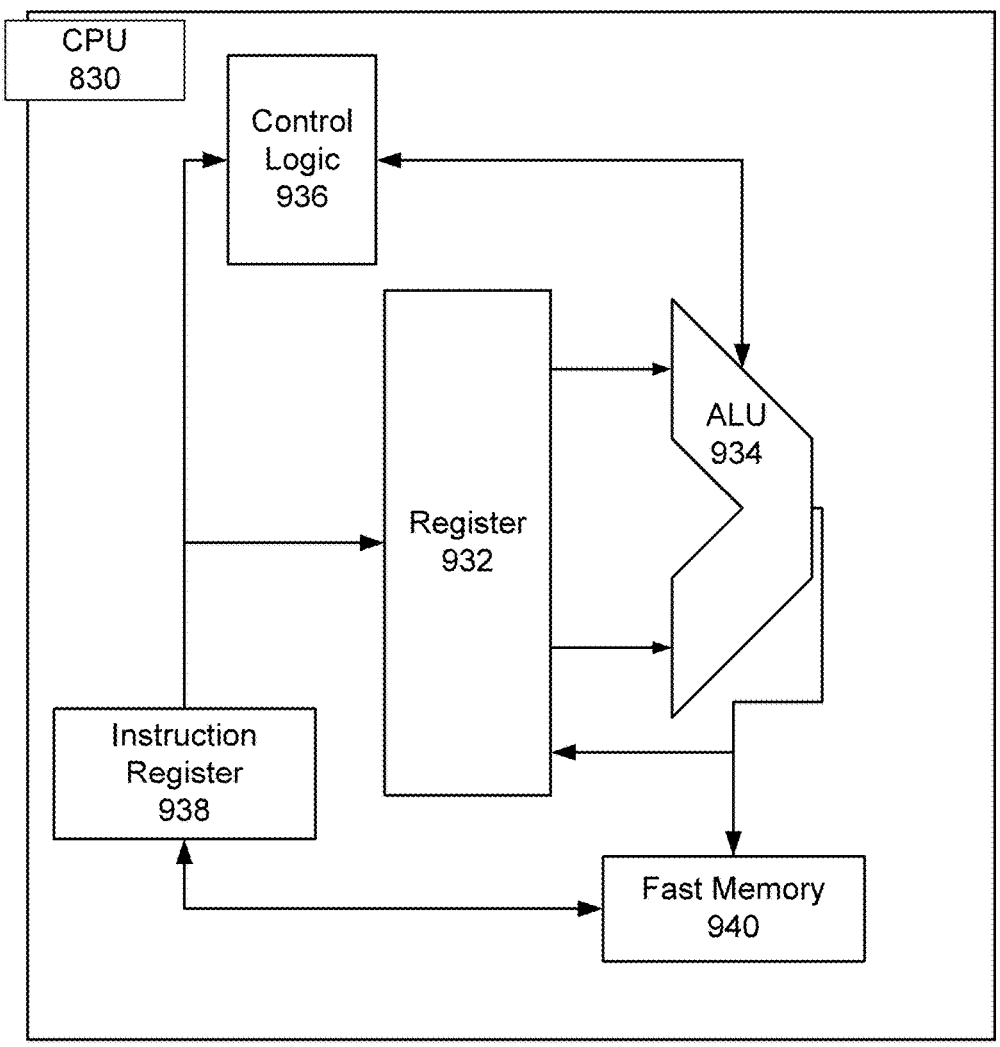
FIG. 9 is an exemplary schematic diagram of a CPU used in the control units according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
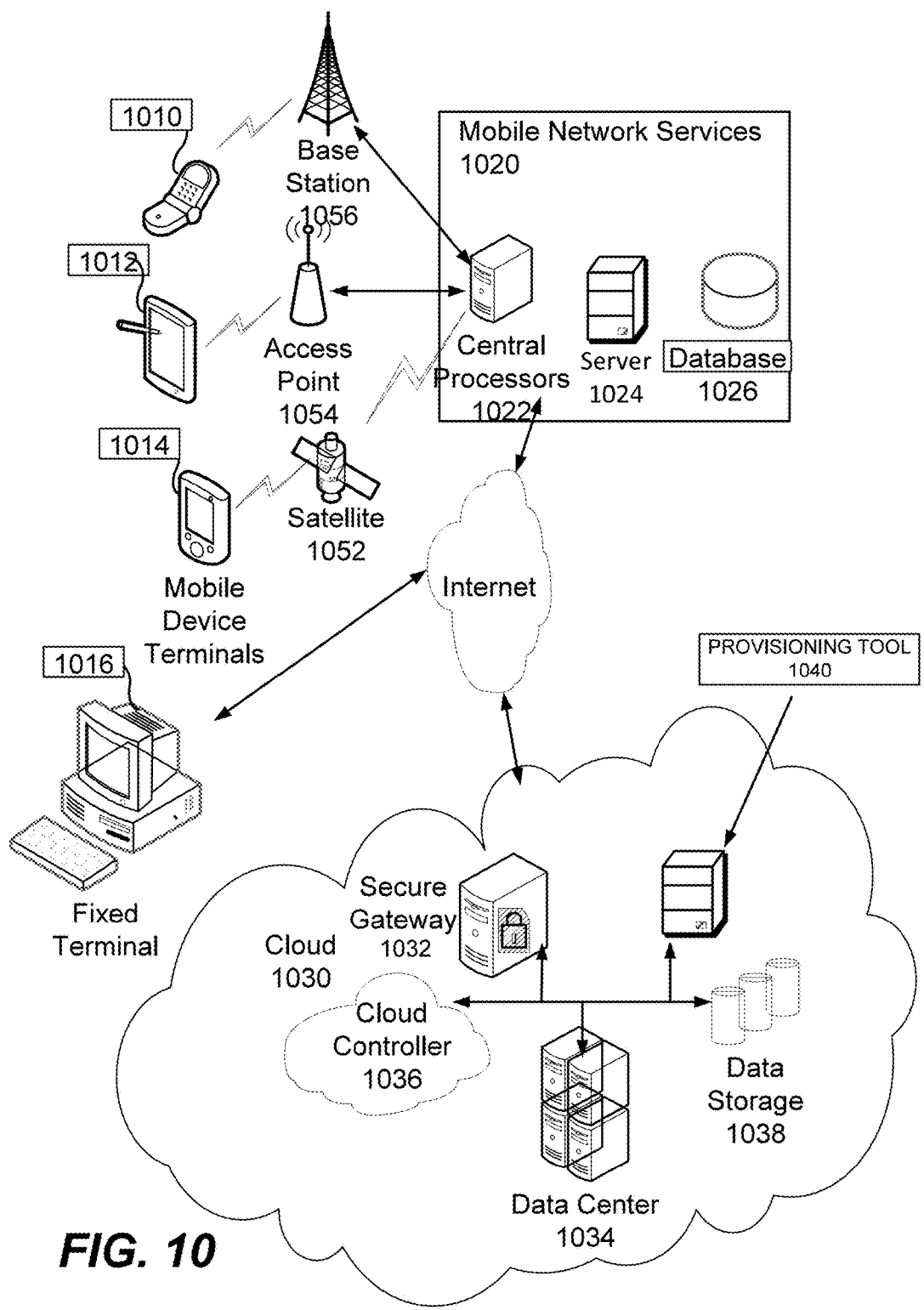
FIG. 10 is an illustration of a non-limiting example of distributed components which may share processing with the control units, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A wireless sensor network for providing base station anonymity, comprising:
  a plurality of wireless sensor nodes having circuitry configured to transmit nodal data;
  a plurality of cluster heads, wherein the plurality of cluster heads are arranged in a grid configuration, the grid having a center point, a first axis, a second axis and a boundary, wherein the first axis and the second intersect at the center point of the grid and extend to the boundary, and wherein the first axis and the second axis are perpendicular to one another;
  a plurality of fake base stations arranged along the first and second axes of the grid configuration;
  a base station, wherein the base station is located at the center point of the grid configuration;
  wherein each cluster head has circuitry configured to receive nodal data packets from a unique set of sensor nodes chosen from the plurality of sensor nodes, aggregate the nodal data packets to originate an aggregated data packet, and transmit the aggregated data packet in a first direction to at least one of a fake base station and an adjacent cluster head; and
  wherein each fake base station has circuitry configured to receive an aggregated data packet from a cluster head and transmit the aggregated data packet in a second direction to the base station.

2. The wireless sensor network of claim 1, further comprising:
  wherein the base station has circuitry configured to generate a fake data packet upon receiving a data packet originating from a cluster head; and
  wherein the base station further has circuitry configured to transmit the fake data packet in a third direction along the first axis to a fake base station, wherein the third direction along the first axis is antiparallel to the first direction and towards the location in the grid of the cluster head which originated the aggregated data packet.

3. The wireless sensor network of claim 2, further comprising:
wherein each fake base station has circuitry configured to receive at least one of an aggregated data packet and a fake data packet;
wherein each fake base station further has circuitry configured to transmit the at least one of an aggregated data packet and a fake data packet to at least one of a fake base station, a cluster head or the base station;
wherein a direction of transmission of the aggregated data packet towards the fake base station is antiparallel to the direction of transmission of the fake data packet along the first axis, and the direction of transmission of the fake data packet along the second axis is antiparallel to the direction of transmission of the fake data packet from the fake base station aligned with the originating cluster head and the originating cluster head.

4. The wireless sensor network of claim 3, further comprising:
wherein the grid includes a first quadrant, a second quadrant, a third quadrant and a fourth quadrant defined by the first and second axes;
wherein each quadrant includes a rectangular division of grid positions, the rectangular grid divisions defining rows and columns.

5. The wireless sensor network of claim 4, further comprising:
wherein each cluster head in a quadrant has circuitry to transmit an aggregated data packet along a row of the grid to either an intermediate cluster head in the direction of the second axis or to a fake base station on the second axis, such that:
the intermediate cluster head receives and forwards the aggregated data packet toward at least one of a next intermediate cluster head in the row in the direction of the fake base station or toward the fake base station, or
the fake base station receives the aggregated data packet.

6. The wireless sensor network of claim 1, further comprising:
wherein each sensor node, cluster head and fake base station includes circuitry to determine its location and the location of the sensor nodes, cluster heads, false base stations and the base station.

7. The wireless sensor network of claim 1, further comprising;
wherein each cluster head receives nodal data from a set of nodes of the plurality of nodes, the set of nodes capable of transmitting data to the cluster head at a predetermined amplitude and frequency.

8. The wireless sensor network of claim 1, further comprising:
wherein each sensor node has circuitry configured to cause the sensor to sleep for a time period;
wherein the base station further has circuitry configured to transmit a command directing a sensor node to sleep for a time period, $\tau$;
wherein each sensor node has circuitry configured to receive the command and to sleep for the time period, $\tau$.

9. The wireless sensor network of claim 1, further comprising:
wherein each cluster head has circuitry configured to lower its traffic by at least one of delaying the transmission of aggregated data packets and ceasing transmission for a time period, $\tau$;
wherein each cluster head further has circuitry configured to increase its traffic by dividing each aggregated data packet into two or more aggregated data packets;
wherein the base station has circuitry including program instructions configured to analyze the wireless network traffic in order to
determine the traffic originating from each cluster head;
compare the traffic from each cluster head to a threshold, cover Threshold;
determine the traffic threshold needed at each cluster head to obscure the location of the base station; and
direct the cluster heads having traffic lower than the threshold to lower their traffic; and
direct the cluster heads having traffic higher than the threshold to increase their traffic.

10. A method for providing base station anonymity in a wireless sensor network, comprising:
receiving, at an originating cluster head, at least one nodal data packet from at least one of a plurality of sensor nodes during a time period $\tau$;
combining the nodal data packets to form an aggregated data packet;
transmitting, by the cluster head, the aggregated data packet in a first direction toward a first fake base station;
receiving, by the first fake base station, the aggregated data packet;
transmitting, by the fake base station, the aggregated data packet in a second direction toward the base station;
receiving, by the base station, the aggregated data packet;
generating, by the base station, a fake data packet;
transmitting, by the base station, the fake data packet in a third direction toward a fake base station, the third direction antiparallel to the first direction;
forwarding, by fake base station, the fake data packet in a direction antiparallel to the second direction, until the fake data packet is received by the originating cluster head, then ceasing the forwarding of the fake data packet.

11. The method of claim 10, further comprising:
arranging the cluster heads, fake base stations and base station in a substantially rectangular grid configuration, the grid having a center, a first axis, x, and a second axis, y, the second axis perpendicular to the first axis, wherein the first and second axis intersect at the center,
wherein the rectangular grid includes a first quadrant, a second quadrant, a third quadrant and a fourth quadrant defined by the first and second axes; and
wherein each quadrant includes a rectangular division of grid positions, the rectangular grid divisions defining rows and columns;
wherein each grid position on the rectangular grid is defined by a corresponding set of coordinates, (x, y);
wherein fake base stations are positioned at grid positions on the rectangular grid on the x and y axes, wherein the base station is positioned at the center of the rectangular grid, and wherein the cluster heads are positioned at grid positions on the rectangular grid not including the center and the x and y axes.

12. The method of claim 11, wherein the step of forwarding a fake data packet toward an originating cluster head comprises transmitting the fake data packet in a third direction along the first axis to a fake base station, wherein the direction along the first axis antiparallel to the first direction and towards the position in the grid of the cluster head which originated the aggregated data packet.

13. The method of claim 11, further comprising:
transmitting, by the base station, for each cluster head located at coordinate position (a, b), the fake data packet along the first axis in the direction of a;
receiving, by a fake base station adjacent to the base station, the fake data packet,
determining whether the adjacent fake base station is positioned at the coordinate (a, 0);
  if the adjacent fake base station is at the position (a, 0), transmitting, by the fake base station, the fake data towards a first adjacent cluster head in the b direction;
if the adjacent fake base station is not at the position (a, 0), forwarding, by the adjacent fake base station, the fake data packet along the first axis by intermediate fake base stations in the direction of a until the fake data packet is received by a fake base station located at the coordinates (a, 0), then transmitting, by the fake base station, the fake data towards a first adjacent cluster head in the b direction.

14. The method of claim 13, further comprising:
determining whether the first adjacent cluster head is at the position (a, b),
  if the first adjacent cluster head is at position (a, b), stop transmitting the fake data packet;
  if the first adjacent cluster head is not at position (a, b), forwarding the fake data packet to intermediate cluster heads until the fake data packet reaches the originating cluster head at (a, b); and then stop transmitting the fake data packet.

15. The method of claim 10, further comprising:
hiding the base station by identifying cluster heads which are transmitting high volumes of traffic and instructing the identified cluster head to sleep for a period of time.

16. The method of claim 10, further comprising:
determining, by the base station, the traffic originating from each cluster head;
determining a traffic threshold needed at each cluster head to obscure the location of the base station;
comparing, by the base station, the traffic at each cluster head to the traffic threshold;
commanding the cluster heads having traffic lower than the threshold to lower their traffic;
wherein lowering traffic comprises commanding nodes to sleep; and
commanding the cluster heads having traffic higher than the threshold to increase their traffic, wherein increasing traffic comprises dividing an aggregated data packet into two or more packets.

17. A non-transitory computer readable medium having instructions stored therein that, when executed by one or more processors, causes the one or more processors to perform a method for providing base station anonymity in a wireless sensor network, comprising:
receiving, at an originating cluster head, at least one nodal data packet from at least one of a plurality of sensor nodes during a time period τ;
combining the nodal data packets to form an aggregated data packet;
transmitting, by the cluster head, the aggregated data packet in a first direction toward a first fake base station;
receiving, by the first fake base station, the aggregated data packet;
transmitting, by the fake base station, the aggregated data packet in a second direction toward the base station;
receiving, by the base station, the aggregated data packet;
generating, by the base station, a fake data packet;
transmitting, by the base station, the fake data packet in a third direction toward a fake base station, the third direction antiparallel to the first direction;
forwarding, by fake base station, the fake data packet in a direction antiparallel to the second direction, until the fake data packet is received by the originating cluster head, then ceasing the forwarding of the fake data packet.

18. The non-transitory computer readable medium of claim 17, further comprising:
arranging the cluster heads, fake base stations and base station in a substantially rectangular grid configuration, the grid having a center, a first axis, x, and a second axis, y, the second axis perpendicular to the first axis, wherein the first and second axis intersect at the center,
wherein the rectangular grid includes a first quadrant, a second quadrant, a third quadrant and a fourth quadrant defined by the first and second axes; and
wherein each quadrant includes a rectangular division of grid positions, the rectangular grid divisions defining rows and columns;
wherein each grid position on the rectangular grid is defined by a corresponding set of coordinates, (x, y);
wherein fake base stations are positioned at grid positions on the rectangular grid on the x and y axes, wherein the base station is positioned at the center of the rectangular grid, and wherein the cluster heads are positioned at grid positions on the rectangular grid not including the center and the x and y axes.

19. The non-transitory computer readable medium of claim 17, further comprising:
transmitting, by the base station, for each cluster head located at coordinate position (a, b), the fake data packet along the first axis in the direction of a;
receiving, by a fake base station adjacent to the base station, the fake data packet,
determining whether the adjacent fake base station is positioned at the coordinate (a, 0);
  if the adjacent fake base station is at the position (a, 0), transmitting, by the fake base station, the fake data towards a first adjacent cluster head in the b direction;
  if the adjacent fake base station is not at the position (a, 0), forwarding, by the adjacent fake base station, the fake data packet along the first axis by intermediate fake base stations in the direction of a until the fake data packet is received by a fake base station located at the coordinates (a, 0), then transmitting, by the fake base station, the fake data towards a first adjacent cluster head in the b direction;
determining whether the first adjacent cluster head is at the position (a, b),
  if the first adjacent cluster head is at position (a, b), stop transmitting the fake data packet;
  if the first adjacent cluster head is not at position (a, b), forwarding the fake data packet to intermediate cluster heads until the fake data packet reaches the originating cluster head at (a, b); and then stop transmitting the fake data packet.

20. The non-transitory computer readable medium of claim 17, further comprising:
determining, by the base station, the traffic originating from each cluster head;

determining a traffic threshold needed at each cluster head to obscure the location of the base station;

comparing, by the base station, the traffic at each cluster head to the traffic threshold;

commanding the cluster heads having traffic lower than the threshold to lower their traffic; wherein lowering traffic comprises commanding nodes to sleep; and commanding the cluster heads having traffic higher than the threshold to increase their traffic, wherein increasing traffic comprises dividing an aggregated data packet into two or more packets.

\* \* \* \* \*